(12) United States Patent
Panchamia et al.

(10) Patent No.: US 11,729,004 B2
(45) Date of Patent: Aug. 15, 2023

(54) CERTIFICATE-BASED REMOTE DYNAMIC ISOLATION OF IOT DEVICES USING DISTRIBUTED LEDGER TECHNOLOGIES

(71) Applicants: Sanket Panchamia, Bangalore (IN); Kanupriya Pandey, Bangalore (IN); Mehdi Entezari, Blue Bell, PA (US); Sachin B Patil, Bangalore (IN); Amith Kk, Bangalore (IN); Robert A Johnson, Collegeville, PA (US)

(72) Inventors: Sanket Panchamia, Bangalore (IN); Kanupriya Pandey, Bangalore (IN); Mehdi Entezari, Blue Bell, PA (US); Sachin B Patil, Bangalore (IN); Amith Kk, Bangalore (IN); Robert A Johnson, Collegeville, PA (US)

(73) Assignee: Unisys Corporation, Blue Bell, PA (US)

( * ) Notice: Subject to any disclaimer, the term of this patent is extended or adjusted under 35 U.S.C. 154(b) by 134 days.

(21) Appl. No.: 17/475,397

(22) Filed: Sep. 15, 2021

(65) Prior Publication Data
US 2022/0393884 A1 Dec. 8, 2022

(30) Foreign Application Priority Data

Jun. 3, 2021 (IN) .............................. 202111024746

(51) Int. Cl.
*H04L 9/32* (2006.01)
*H04L 9/08* (2006.01)
*H04L 9/00* (2022.01)

(52) U.S. Cl.
CPC ............ *H04L 9/3268* (2013.01); *H04L 9/083* (2013.01); *H04L 9/0891* (2013.01); *H04L 9/3215* (2013.01); *H04L 9/50* (2022.05)

(58) Field of Classification Search
CPC .................................................... H04L 9/3268
See application file for complete search history.

(56) References Cited

U.S. PATENT DOCUMENTS

| | | | |
|---|---|---|---|
| 10,243,748 B1 * | 3/2019 | Callan ................... | H04L 9/3239 |
| 2019/0253434 A1 * | 8/2019 | Biyani .................. | H04L 63/126 |
| 2019/0305938 A1 * | 10/2019 | Sandberg-Maitland | ..................... H04L 9/0897 |
| 2020/0013050 A1 * | 1/2020 | Finlow-Bates ....... | H04L 9/3239 |

\* cited by examiner

*Primary Examiner* — Bradley W Holder
(74) *Attorney, Agent, or Firm* — Merchant & Gould P.C.

(57) ABSTRACT

Methods and systems for remote dynamic isolation of IoT devices are provided. One system includes a first IoT device and a second IoT device configured with an active communication channel with the first IoT device and a role certificate. An operator device is configured to interact with a distributed ledger to issue and revoke role certificates for a plurality of devices including the first IoT device and the second IoT device. The first IoT device periodically validates a role certificate proof received from the second IoT device with an entry of the role certificate proof recorded on the distributed ledger.

20 Claims, 20 Drawing Sheets

CERTIFICATE-BASED REMOTE DYNAMIC ISOLATION OF IOT DEVICES USING DISTRIBUTED LEDGER TECHNOLOGIES

BACKGROUND

The security of different devices containing computing elements is important to the integration of these devices with a group of devices or within a network. Examples of such devices include Internet-of-Things (IoT) devices. In many examples, a plurality of IoT devices are configured to communicate with each other (Machine-to-Machine communication). In some examples these devices use a centralized system for establishing trust and a secure communication channel.

Before an individual or an enterprise receives an IoT device, the device typically has gone through a supply chain and delivery process. As the device is manufactured and various pans are delivered through the supply chain, the device may be in the possession of several companies, suppliers, manufacturers, and carriers. Additionally, the delivery of the device includes exchanging possession of the device to carriers, warehouses, and stores. In some cases, by the time the device reaches the individual or enterprise it may have been compromised. In other cases, a counterfeited device may be the purchased by the individual or enterprise. For example, the genuine device might have been replaced with a counterfeit device by a bad actor in the supply chain. Connecting a compromised or counterfeited device with other devices and/or a network may put the other devices and the network at risk of attacks. For example, a comprised device may be a source of a DDoS attack or may provide it backdoor to a command and control center set up by malicious actors.

In some instances, a device may become compromised while it is used by an individual or entity. For example, a device may be virtually or physically tampered with causing the device to become compromised. In other examples, a security vulnerability may exist in the IoT device causing the device to becoming compromised or putting the device at risk of being compromised.

IoT devices may include many different protocols to communicate with each other OF operators. For example, some devices may be Wi-Fi enabled, 4G/5G/LTE enabled, and/or Bluetooth enabled. IoT devices may have limited processing power and may be connected to a network with low bandwidth.

SUMMARY

In accordance with the present disclosure, the above and other issues are addressed by the following:

In a first aspect, a system includes a first IoT device and a second IoT device configured with an active communication channel with the first IoT device and a role certificate. The system includes an operator device is configured to interact with a distributed ledger to issue and revoke role certificates for a plurality of devices including the first IoT device and the second IoT device. The first IoT device periodically validates a role certificate proof received from the second IoT device with an entry of the role certificate proof recorded on the distributed ledger.

In a second aspect, a method of establishing trust between devices includes establishing, at a first IoT device, a communication channel with a second IoT device, and requesting and receiving, at the first IoT device, a role certificate proof from the second IoT device, wherein the role certificate proof is managed by an operator device. The method further includes verifying periodically, at the first IoT device, the role certificate proof with an entry of the role certificate proof recorded on a distributed ledger.

In a third aspect, a method for managing devices includes assigning, from an operator device, a first role certificate to a first IoT device and a second role certificate to a second IoT device. The method further includes registering, using the operator device, a proof for each of the role certificates on a distributed ledger, and invalidating a role certificate for the second IoT device. The method also includes registering the invalidation of the role certificate on the distributed ledger, such that the first IoT device terminates communication with the second IoT device when validating the second role certificate.

DETAILED DESCRIPTION

Figure 1:
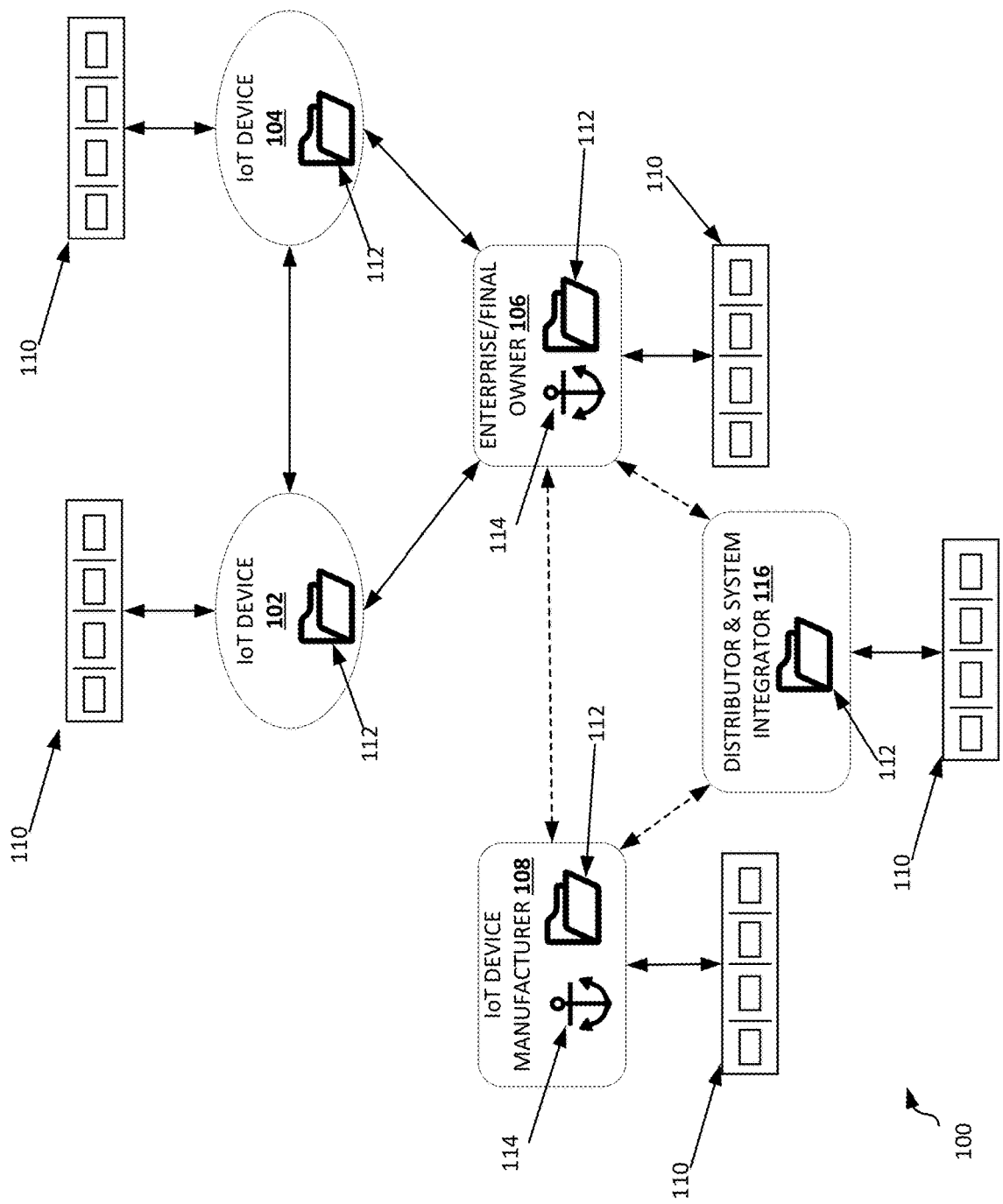
FIG. 1 illustrates a machine-to-machine authentication system, in accordance with some embodiments of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer-implemented steps, operations, or procedures running on a programmable circuit within a computer, and/or (2) a sequence of computer-implemented steps, operations, or procedures running on a programmable circuit within a directory system, database, or compiler.

In general, the present disclosure relates to computer-implemented methods and systems for machine-to machine authentication through mutual verification of a trusted chain of ownership. In another aspect of the present di closure systems and methods for dynamic machine isolation are described. In a third aspect, systems and methods for universal machine-to-machine authentication solutions are disclosed.

In many aspects of the present disclosure a distributed ledger is provided. The distributed ledger is used to track various device using one or more certificates. Updates to the one or more certificates are recorded in a ledger (the "blockchain," which, in one example is maintained in parallel by many different entities in the system and in another embodiment is maintained by a single, private entity).

Blockchain/distributed ledger technologies can be used to store data in an immutable and permanent manner. A blockchain is a consensus-based, electronic ledger, which is implemented as a computer-based decentralized, distributed system made up of blocks, which are made up of transactions. Each transaction is a data structure that encodes the transfer of control of a digital certificate between participants in the blockchain system and includes at least one input and at least one output. Each block contains a hash of the previous block so that blocks become chained together to create a permanent, unalterable record of all transactions that have been written to the blockchain since its inception (the genesis block). In some examples, transactions contain small programs known as scripts embedded into their inputs and outputs, which specify how and by whom the outputs of the transactions can be accessed.

In order for a transaction to be written to the blockchain, it must be "validated." Users perform work to ensure that each transaction is valid, with invalid transactions rejected from the network. If execution of the locking and unlocking scripts evaluate to TRUE, the transaction valid and the transaction is written to the blockchain. Thus, in some examples, in order for a transaction to be written to the blockchain, it must be: i) validated by the first user that receives the transaction—if the transaction is validated, the user relays it to the other users in the network; and ii) added to a new block built by a user.

In many embodiments, this application describes mechanism s for authenticating Internet-of-Things devices (referred to as IoT devices and devices herein) and assign ownership to these devices. These devices often go through several owners or custodians as they go through the supply chain to a final owner/operator. There is a risk that a device becomes compromised or a counterfeit device is introduced in the supply chain by a bad actor before it reaches the final owner. For example, a device may be counterfeited or otherwise compromised by a bad actor.

I. Machine-to-Machine Authentication

FIGS. 1-14 illustrate systems and methods far machine-to-machine authentication. In some aspects of the present disclosure, the methods and systems for machine-to-machine authentication provide approaches to validate the authenticity of IoT devices and detect counterfeit devices or otherwise compromised devices. In other aspects the method and systems for machine-to-machine authentication provides decentralized and immutable certificate management for a plurality of IoT devices.

FIG. 1 illustrates an example machine-to-machine authentication system 100. The system 100 includes IoT Devices 102 and 104, a final owner device 106, a manufacturer device 108, a distributor & system integrator device 116, and a distributed ledger 110. In some examples one or more of the devices includes a wallet 112, and a trust anchor 114.

The system 100 includes IoT Devices 102 and 104. Typically, the IoT devices 102 and 104 include a network interface, and a programmable multi-state controller. The IoT devices (102, 104) can also include various sensor's or a sensor module. The IoT Devices 102 and 104 are pre-programmed to perform a set of tasks, and may be portable, movable across various networks and geographies. For example, an IoT device may act as a temperature sensor for a turbine engine on an airplane and the device may be configured to send a message to a computing device which alerts a pilot or a service technician that an anomaly has been detected.

The IoT devices 102, 104 are each configured to communicate with a plurality of other IoT devices. In the example shown the IoT Device 102 is configured to connect to IoT Device 104, or other devices (not shown). Examples for protocols used for communication between IoT devices include: Wi-Fi, LoRaWAN, wired Ethernet, serial, Bluetooth, Zigbee, 4G Cellular, 5G Cellular and fiber channel connections. In the example shown, each of IoT Device 102 and IoT Device 104 includes a network interface which uses a protocol to establish a communication channel between the devices. In some examples, the IoT Device 102 and the IoT Device 104 are connected through a network. Such networks include public networks, for example, the Internet. In other examples the connection is through a gateway device. The example shown in FIG. 1 includes two devices, but systems work similarly with any number of IoT devices. Additionally, the plurality of IoT devices can include multiples of the same type of devices or many different typos of devices.

In some examples the system 100 includes a final owner device 106. In some examples, the final owner device 106 is a computing device or a computing system controlled by an entity or individual. The final owner device 106 can be an IoT device. The final owner device 106 is configured to manage a plurality of IoT devices in an IoT system. In some examples, the final owner device 106 manages IoT devices in the IoT system by issuing various certificates. In many of these examples, the final owner device 106 is also configured to revoke these certificates. In some examples, the final owner device 106 directly interacts with a device to issue, revoke, or update certificates. The final owner device 106 records the issuance, revocation, or modification certificates on the distributed ledger 110.

In some examples, the system 100 includes a manufacturer device 108. In some examples, the manufacturer device 108 is a computing device or a computing system controlled by a manufacturing entity. In various embodiments, the manufacturer device 108 manages the IoT devices associated with the manufacturer by issuing certificates. Examples, of certificates issued by the manufacturer device 108 include: identity certificates, ownership certificates, and role certificates. The manufacturer device 108 records the certificates on the distributed ledger 110. In some examples, a certificate may be associated with a chain of ownership. In some examples, the chain of ownership and chain of custody starts with the manufacturer of the associated IoT device. In many of these examples, the manufacturer device 108 records itself as the initial owner of the IoT device (in this example at least one of the IoT Device 102 and the Ica Device 104) on the distributed ledger at the time of manufacturing. In some examples, the manufacturer transfers ownership and custody directly to the enterprise/final owner, for example, revoking the ownership certificate assigned to the manufacturer device 108 and issuing the ownership certificate to the final owner device 106. In other examples, the manufacturer may transfer ownership to a distributor & system integrator, using the manufacturer device 108 and the distributor & system integrator device 116. In some examples a trusted entity transfers ownership and custody on behalf of the manufacturer.

Figure 6:
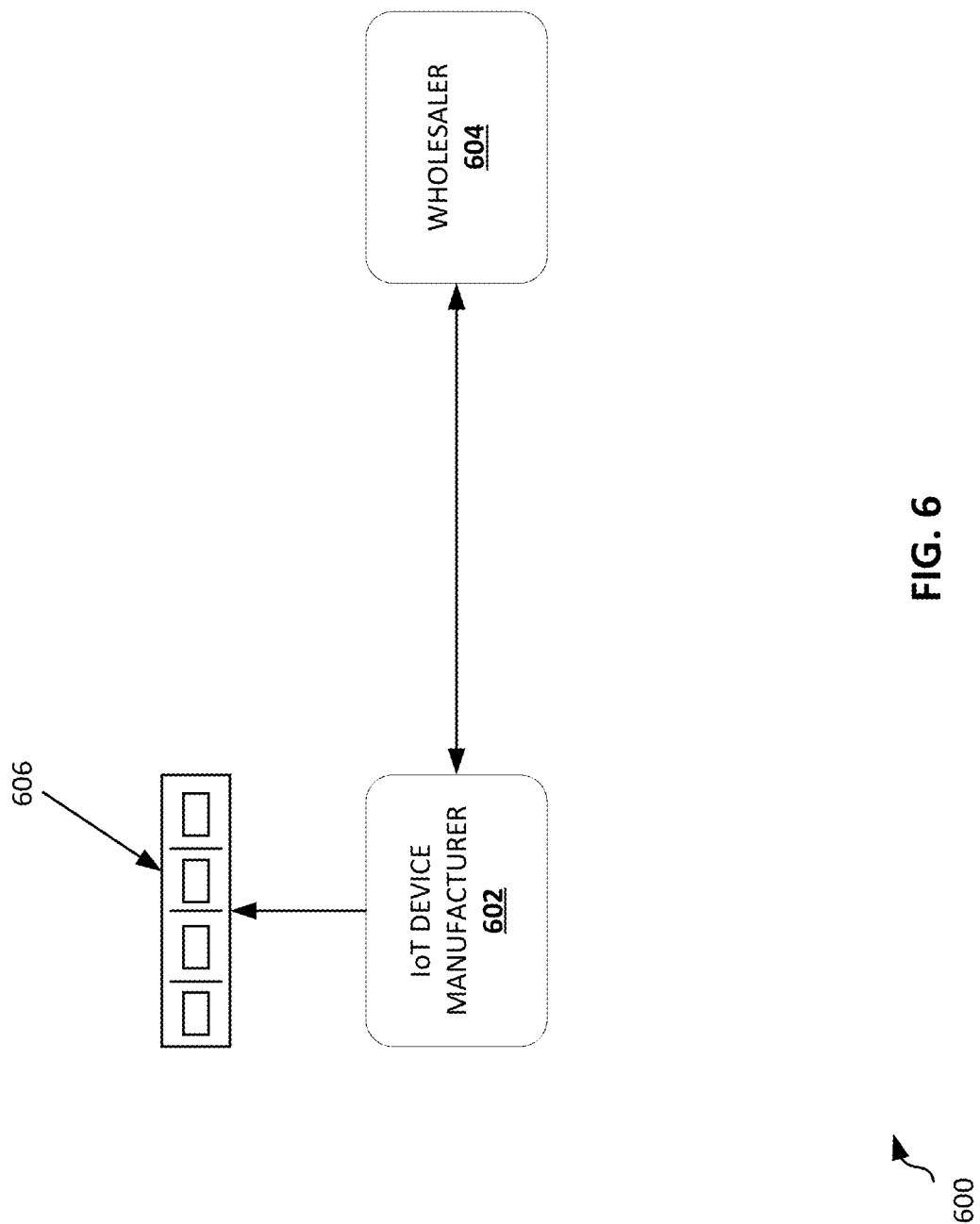
FIG. 6 illustrates a system used to generate and issue an ownership certificate, in accordance with some embodiments of the present disclosure.

In some examples, the system 100 includes a distributor & system integrator device 116. The distributor system integrator device 116 is a computing device, computing system, and/or an IoT device. In some examples, the distributor & system integrator device 116 is associated with one or more intermediatory entities between a manufacturer for an IoT device and the Enterprise/Final owner of the IoT device. For example, the intermediary can be a wholesaler of a device, as shown in the example of FIG. 6. The intermediary can also be a store which sells a device, a distributor for a device, or an integrator/installer for a device. For example, the intermediary may be a smart home device installer which installs and connects various smart home devices for a final owner. In some examples the intermediary is a current owner of a device which is sold to another owner. For example, an airplane electronic device may be sold by one airline to another airline.

The system includes a self-sovereign identity (SSI) and Zero-Knowledge-Proof approach to digital identity that gives actors in the system (e.g. owners of devices and devices) the control of their digital identities. In order to be trusted, one actor in an interaction will present credentials to the other actor, and those relying actors ran verify that the credentials came from a trusted issuer. In this way, the verifier's trust in the issuer is transferred to the credential holder. In this case, the certificates stored in the digital wallet of the IoT devices are self-sovereign credentials in nature i.e., they are verifiable entities on the distributed ledger. These IoT devices and their certificates are identified in the network through unique identifiers called Decentralized Identifiers (DIDs) Every certificate that is held by the IoT device or the owner of device can be verified using zero-knowledge proof (ZKP) i.e., a method by which the one device can share "minimum set of parameters within a certificate" to another device that allows it to verify the proof of the first device.

The system 100 includes a distributed ledger 110. The distributed ledger 110 is used to store data in an immutable and permanent manner. More details of an example distributed ledger implementation are described above. The distributed ledger 110 is used to record proofs for various certificates for a plurality of IoT devices. Examples of certificates proofs recorded include identity certificates, ownership certificates, and role certificates. The distributed ledger 110 provides a decentralized and immutable certificate management system for a plurality of IoT devices. The decentralized nature of the distributed ledger 110 allows the systems and method disclosed here to scale and provides a verifiable record for all issued certificates. The verifiable record can be used to establish trust and define levels of permissions between two or more devices.

In the example of a DID based SSI environment, the distributed ledger is used to store (1) public DIDs and associated DID documents with verification keys and endpoints (2) schemas and credential definitions (3) revocation registries (4) agent authorization policies. This enables any third party to verify any credential that a self sovereign user chooses to share. This approach ensures that the user is in complete control of the data shared, while the third party is able to irrefutably and independently validate the provenance, correctness, and proof of non-revocation of the credential.

In example implementations, an identity certificate creates a unique identifier for the associated IoT device. The cryptographic proof of the identity certificate, is recorded on the distributed ledger 110 in some examples, the issuer of the identity certificate publishes the cryptographic accumulator registry for identity certificate on the distributed ledger. The same accumulator registry is used by the verifier to determine if the identity certificate presented as proof is true or false. Recording die identity certificate on the distributed ledger 110, in some examples, is done in such a manner that the associated device is globally identifiable.

An ownership certificate is assigned to the current owner of the associated device wherein the cryptographic proof of the ownership certificate assigned to the current owner is recorded on the distributed ledger. In some examples, the ownership certificate assigned to the current owner is recorded on the distributed ledger 110. Any change in the ownership and/or custody of the associated device is recorded on the distributed ledger 110. In some embodiments in addition to an ownership there is a custodian certificate. The custodian certificate is used to identify and verify a current custodian of a device. In some examples, a chain of custodians is kept as a record on the distributed ledger.

In some examples, a role certificate defines a list of groups referred to as communities of interest that include the associated device as a member. For example, two or more devices must be members of the communities of interest in order to communicate with each other. These role certificates may be recorded on the distributed ledger 110. In some examples, a manager of IoT devices can also use role certificates to define groups of devices with different levels of permissions.

In some embodiments a schema is used to define the structure and implementation of the various certificates. The schema is modifiable to allow for a configuration which is optimized for the specific IoT system.

In some embodiments of the present disclosure, the system 100 leverages self sovereign identity mechanisms through blockchain technologies such as Hyperledger-Indy or Sovrin to provide autonomy to devices, manufacturers, and operators of devices. These technologies also allow different devices and entities to share proof of their identity, chain of ownership, and/or custody in order to establish mutual trust. In some embodiments, these mechanisms perform various operations using the distributed ledger 110. An example of one mechanism includes, establishing trust between devices or devices and their end-users, autonomously and m a decentralized manner, prior to any communication.

In some examples, various devices include a wallet 112. Typically, the wallet 112 is a secure store for cryptographic material held by the device. For example, the wallet 112 can include decentralized identifiers and keys for the associated device. In some examples, these keys or identifiers are associated with the recorded cryptographic proof of the certificates on the distributed ledger 110.

In some examples, various devices include a trust anchor 114. The trust anchor is an entity, or a device associated with an entity, which is verified and given the role-based capability of issuing certificates far the associated IoT device. The trust anchor can also onboard other entities, or devices, into the ledger and acts as a facilitator for various entities and devices. In the example shown, a device manufacturer and/or an owner of a device can act as a trust anchor for associated IoT devices.

Figure 2:
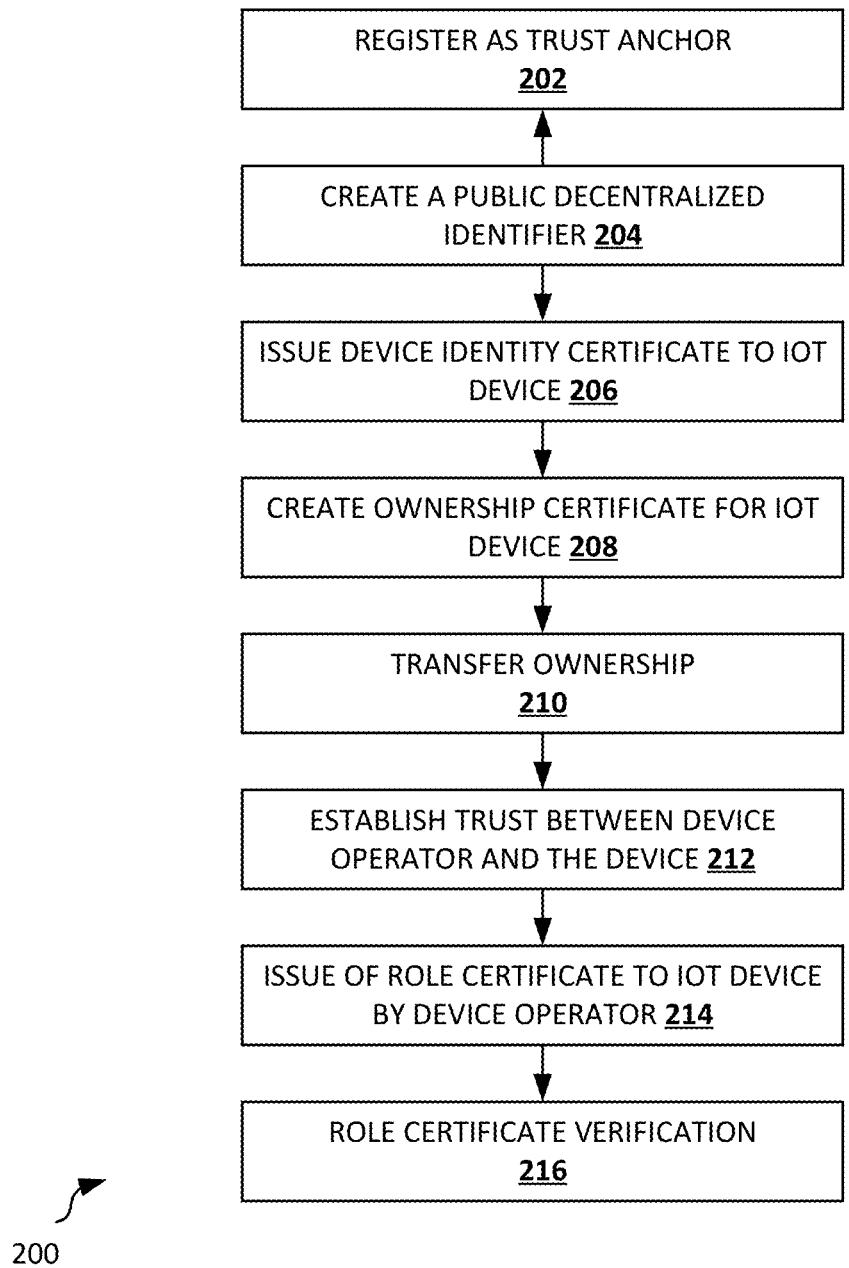
FIG. 2 illustrates a method for managing identification for IoT devices, in accordance with some embodiments of the present disclosure.

FIG. 2 illustrates an example method for managing identification for an IoT device. In some examples, the method 200 is performed using the system 100 illustrated and described in reference to FIG. 1. The method 200 is an example of a mechanism for device identification specifically to implement a machine-to-machine authentication system. In such a system some steps are optional or may be performed in different orders or only an some devices.

In the example, shown, operation 202 registers a manufacturer and/or a device owner as a trust anchor for an IoT device on the distributed ledger. In a typical example, a computing device associated with an entity, including a manufacturer or device owner, creates a record establishing the computing device as a trust anchor tier the IoT device. In some examples the manufacturer establishes itself as a trust anchor for each device manufactured. Similarly, a device owner can register themselves as a trust anchor for one or more devices owned by the device owner. Registering an entity as a trust anchor includes creating a record on the blockchain that a computing device associated with the entity is the trust anchor for the IoT device. In some examples, the trust anchor is an entity that is verified and given permissions to issue certificates, transfer certificates, and assign roles to one or more to devices.

Operation 204 creates a public decentralized identifier for the IoT device. In some examples, a decentralized identifier is a globally unique and resolvable identifier that is associated with an identity record. The public record includes public data such as public keys, service endpoints, credential schemas, and credential definitions. In some examples the operation 204 is performed by any emit which is registered as a trust anchor for the device.

Figure 3:
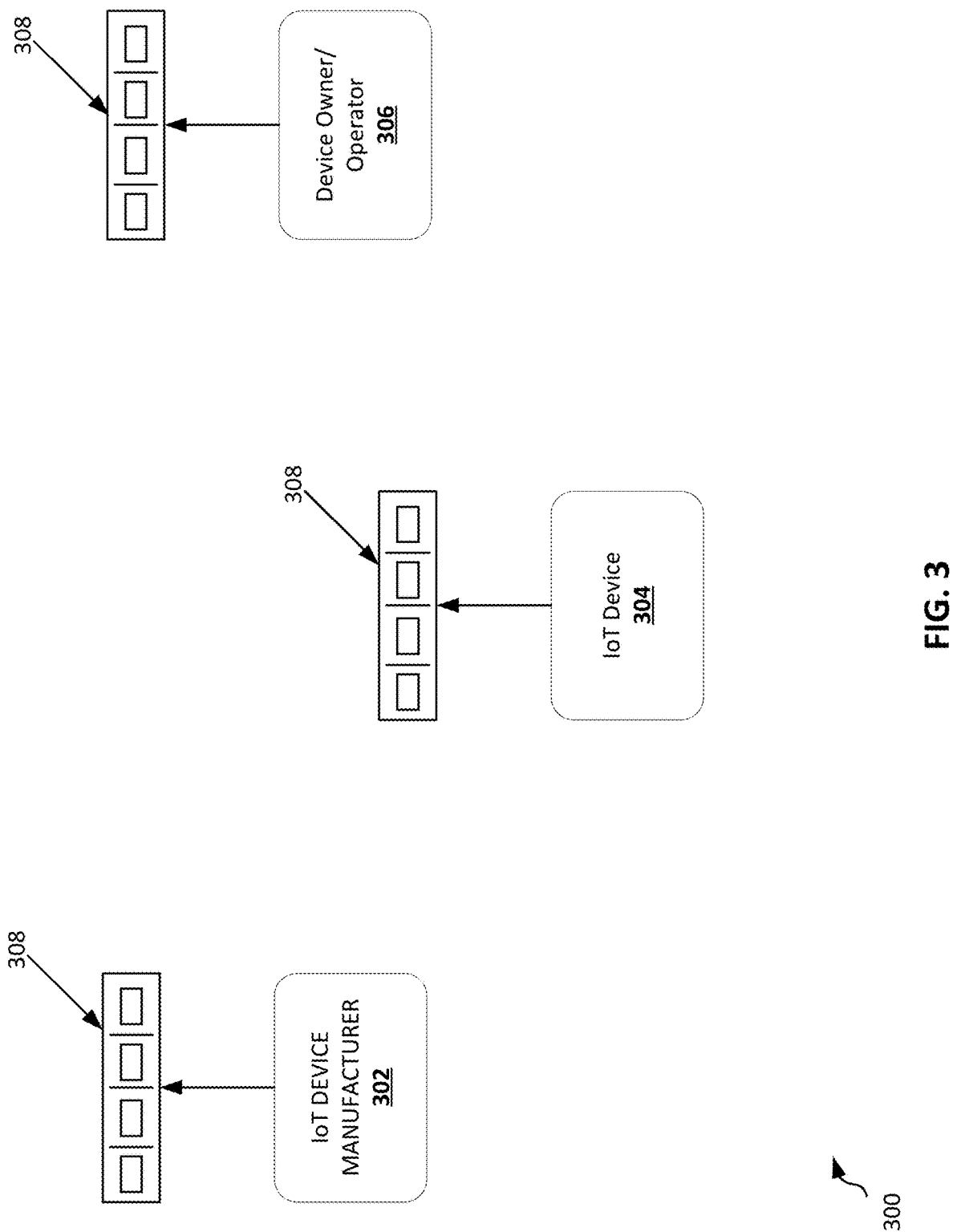
FIG. 3 illustrates a system to update a distributed ledger, in accordance with some embodiments of the present disclosure.
Figure 4:
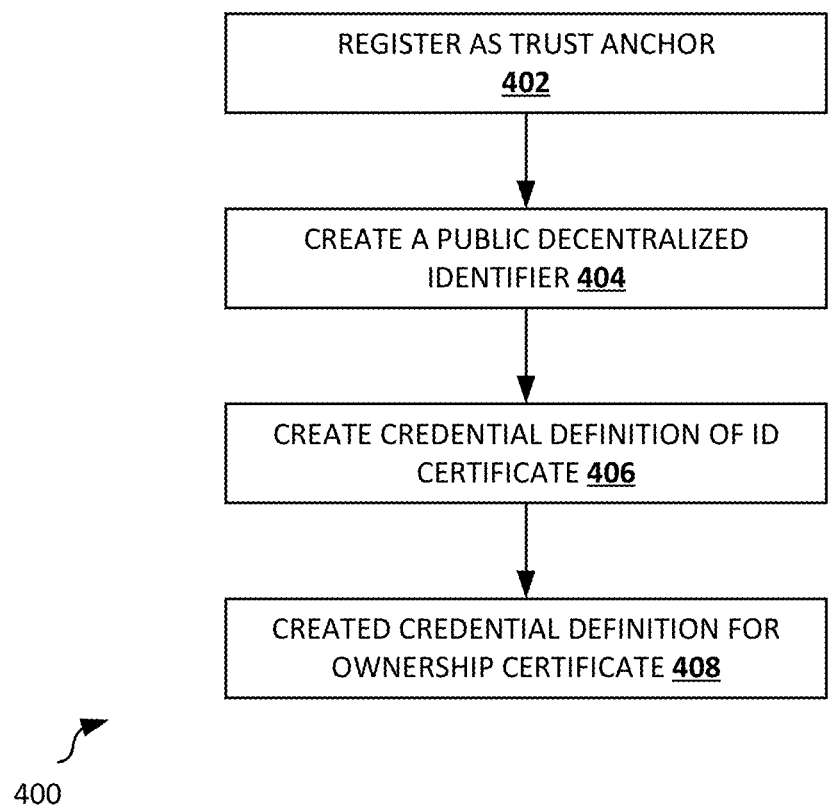
FIG. 4 illustrates a method for updating a distributed ledger from a manufacturer device, in accordance with some embodiments of the present disclosure.

An example system 300 and method 400 for the operations 202 and 204 is illustrated and described in reference, to FIGS. 3 and 4.

In the example shown, operation 206 issues an identity certificate to the IoT device. In such examples, the manufacturer, or the associated computing system, generates a device identity certificate. The cryptographic proof of the identity certificate is recorded on the distributed ledger and issued to the IoT device. The identity certificate is associated with a unique and resolvable global identifier, in some examples, created in operation 204. In some embodiments, issuing the identity certificate includes providing a private key which the IoT device stores in a secure digital wallet. An example system 500 and method 700 of the operation 206 is illustrated and described, in reference to FIGS. 5 and 7, below.

In the example shown, operation 208 creates an ownership certificate for the IoT device. The ownership certificate signifies that the IoT device is owned by a specific entity. The manufacturer, or associated computing system, records an ownership certificate for the device on the distributed ledger. In some examples, recording the owner on the distributed ledger is used to generate a chain of ownership for the IoT device. In some examples, the manufacturer issues the ownership certificate to the owner of the device (for example, a wholesaler) or a device associated with the owner. An example system 600 and method 700 of the operation 206 is illustrated and described in reference to FIGS. 6-7.

The operation 210 transfers the ownership of an IoT device from a seller to a buyer. In some examples, the device manufacturer transfers the ownership certificate from the buyer to the seller, or devices associated with the buyer and seller, and record the transfer on the distributed ledger. In one example, the device manufacturer revokes the old ownership certificate and reissues a new ownership certificate, and records the chain in the chain of custody on the distributed ledger In other examples, the transfer of ownership from a buyer to a seller is done by the current owner of the device. The operation 210, in some examples, can be done by any device which is a trust anchor for the IoT device. Typically, recording the transfer of ownership on the distributed ledger is done to create a chain of ownership for the device. An example system 800 and method 900 for transferring ownership is illustrated and described in reference to FIGS. 8 and 9.

The operation 212 establishes trust between the device operator and the IoT device. In some examples, the operation 212 is performed when an entity receives an IoT device. The device operator requests the identity certificate from the IoT device. Next, the device operator verifies the IoT device identity certificate by verifying the identity record on the distributed ledger. Verifying the IoT device on the distributed ledger allows the device operator to establish trust in an IoT device using a common global and decentralized method. In some examples, the device operator is an entity which owns the IoT device.

In some examples, the IoT device requests ownership proof from the device operator For example, when a device is received by an entity the device may be configured to verify ownership before giving the entity permissions to integrate the device in a system. The IoT device requests an ownership certificate from the device operator and verifies the ownership certificate on the distributed ledger. In some examples, the IoT device only establishes trust with the device operator if the device operator is the verified owner of the IoT device. In other examples, the IoT device is allowed to establish trust with other device operators which are not owners of the IoT device.

Figure 10:
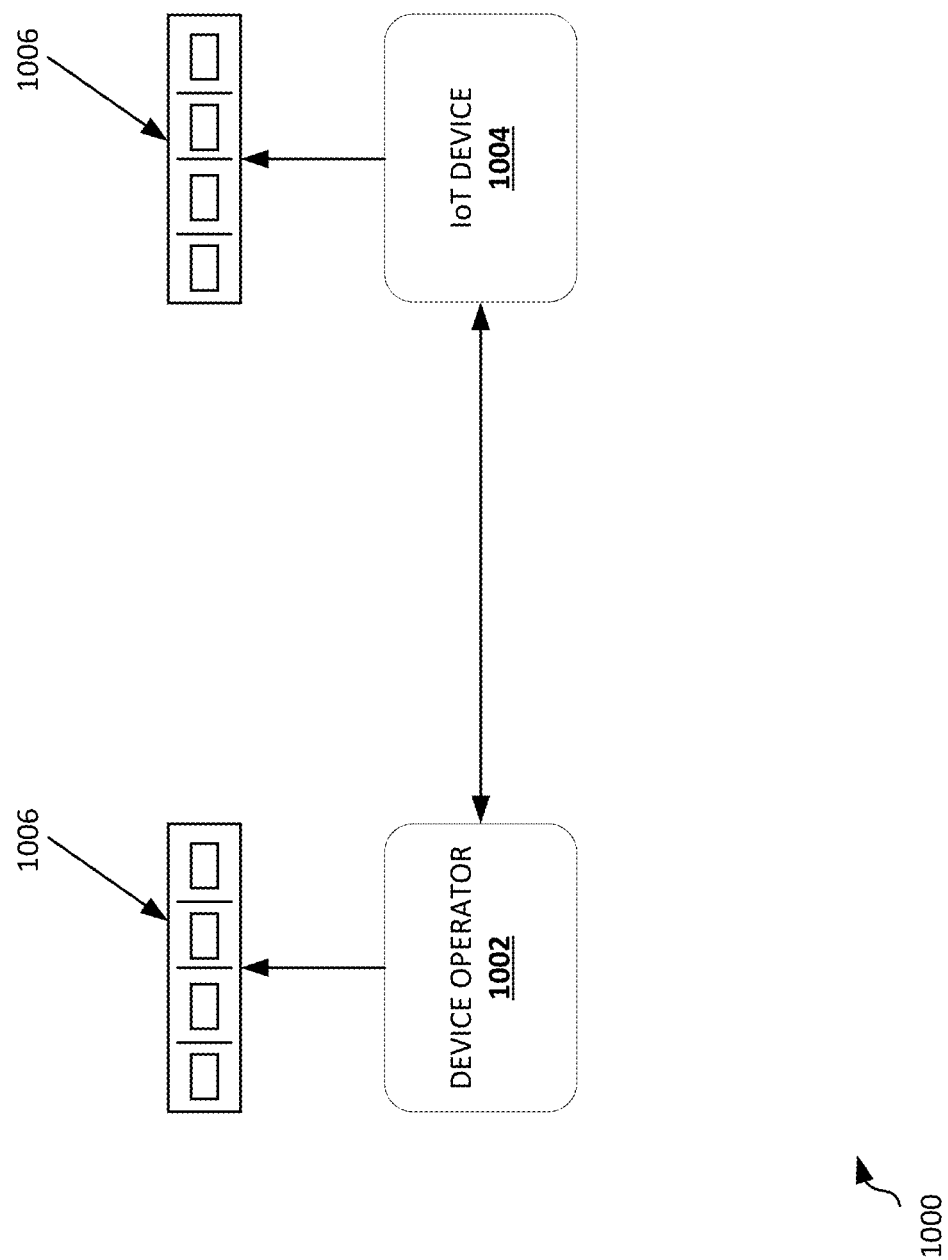
FIG. 10 illustrates a system used to establish trust with a device, m accordance with some embodiments of the present disclosure.
Figure 11:
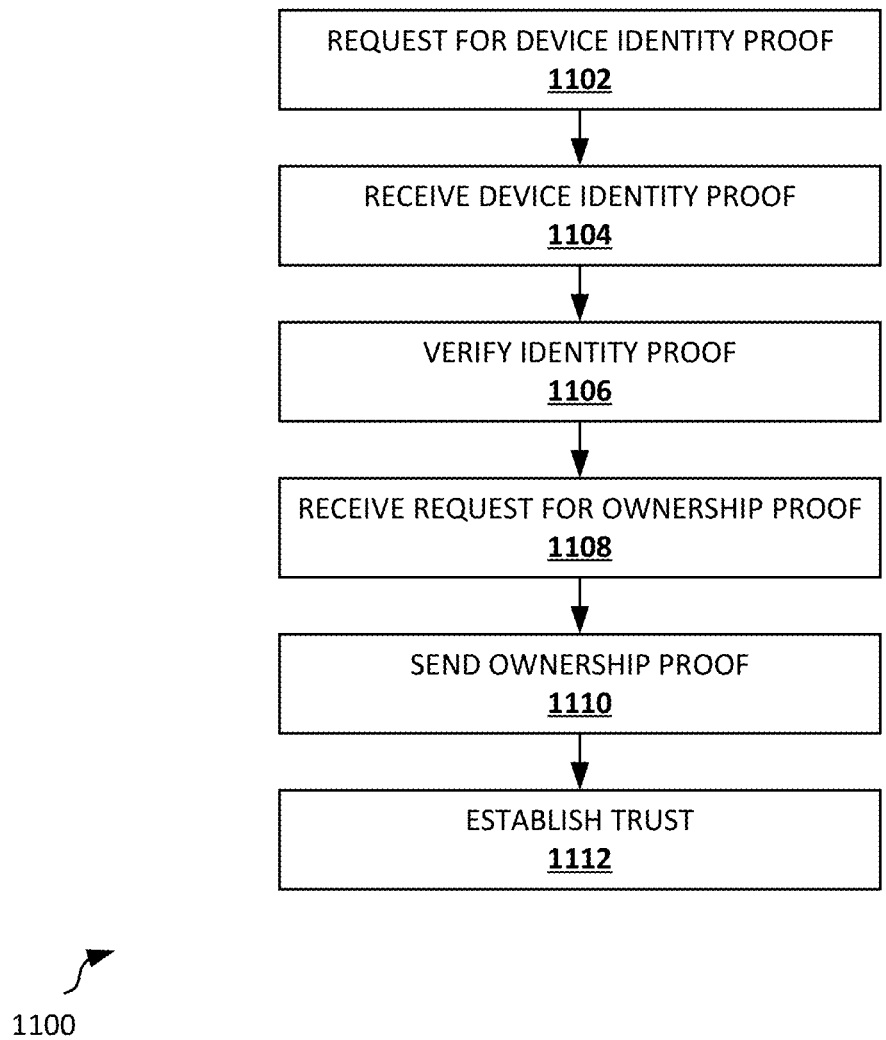
FIG. 11 illustrates a method for establishing trust with a device, in accordance with some embodiments of the present disclosure.

An example system 1000 and an example method 1100 for establishing trust between a device operator and a device is illustrated and described in reference to FIGS. 10 and 11.

The operation 214 issues a role certificate to the to T device, in the typical example the device operator generates and issues the role certificate to the IoT device. In some examples, the role certificate defines groups (communities of interests) for which the device is a member. In some of these examples, the device is only allowed to communicate with other devices which are members of the same group. In one example, the device operator issues the role certificate to the IoT device after recording the role certificate on the distributed ledger. An example system 1000 and an example method 1200 for issuing a role certificate to a device are illustrated and described in reference to FIGS. 10 and 12.

The operation 216 verifies the role certificate of the IoT devices. In one example, two or more devices mutually verify the role certificates of the other devices. In some examples, the devices exchange self-sovereign proofs of the role certificates which ate used to which each device verifies with the information committed to the distributed ledger. Next, each device verifies the role certificates on the distributed ledger. If the role certificates are not properly verified, then the devices will not establish mutual trust. For example, when a device is compromised or counterfeit the verification of role certificate fails. However, if both devices successfully verify the role certificates then the devices will establish trust and if both devices are members to one or more to the same group s then the devices will establish a secure communication channel. Examples of systems and methods for mutual verification of role certificates between devices are illustrated and described in reference to FIGS. 13-17.

FIG. 3 illustrates an example system 300 for updating a distributed ledger 308. In the example shown, the system includes a manufacturer device 302, an IoT device 304, an owner/operator device 300, and a distributed ledger 306. Each of the devices 302, 304, and 300 records and/or verifies one or more certificates on the distributed ledger 308 in different examples. Examples of suitable distributed ledgers are described above.

The system 300 includes a manufacturer device 302. The manufacturer device 302 records and verifies various certificates to the distributed ledger 308. Examples of actions performed by the manufacturer device 302 on the distributed ledger include: (1) recording identity certificates for each device manufactured; (2) recording registration of the manufacturer device 302 as a trust anchor for a device manufactured; (3) recording an ownership certificate to a buyer of the device; (4) verifying the ownership certificate of a seller of a device and recording a transfer of ownership to a buyer of the device. In some examples the manufacturer device 302 is associated with a manufacturer which manufactured the IoT device 304. An example method of the manufacturer device 302 performing typical interactions with the distributed ledger 308 is illustrated in reference to FIG. 4.

The system 300 includes an IoT device 304. In some examples, the IoT device 304 records its identity on the distributed ledger 308. In other examples, the IoT device 304 verifies the chain of ownership of another device in order to establish trust. The IoT device can verify a variety of certificates including, ownership certificates, identity certificates, and role certificates with a second device that the IoT device is attempting to establish trust with or, in some examples, a secure communication channel with.

The system 300 includes an owner/operator device 300. In a typical example the device owner/operator is responsible for generating and issuing role certificates to devices which it owns. In these examples, the owner/operator device 306 can record the cryptographic proof of the role certificates on the distributed ledger 308. In other examples, the owner/operator device 306 is involved in the transfer of ownership of an IoT device. In some examples, the device owner receives a device and wants to verify the device before establishing trust. For example, the device owner may receive the IoT Device 104 from a seller of the device. In such examples, the owner/operator device 306 verifies the cryptographic proof of the identity certificate of the device on the distributed ledger. In some examples, verifying the identity certificate on the distributed ledger may also include verifying the chain of ownership for the device on the distributed ledger.

FIG. 4 is an example method 400 of updating a distributed ledger from a manufacturer device. In other examples the method 400 is performed in a similar manner b the owner/operator device 306 illustrated and described in reference to FIG. 3. The example method 400 includes the operations 402, 404, 406, and 408.

In the example shown, the operation 402 registers the manufacturer as a trust anchor for each device manufactured. The registration of the manufacturer device as a trust anchor is recorded, on the distributed ledger. Registering the manufacturer device as a trust anchor allows the manufacturer device to act as the facilitator far registering devices on the distributed ledger and issuing certificates to these devices.

In the example shown, the operation 404 creates a decentralized identifier for each device manufactured. The decentralized identifier is globally unique and globally resolvable and is associated with an IoT device. The decentralized identifier is recorded on the distributed In the example shown, the operation 406 creates a credential definition for the identification certificate. The identification certificate is associated with the decentralized identifier. The manufacture device issues the identification certificate to the corresponding IoT device. An example of issuing an identity certificate to an IoT device by a manufacturer is illustrated and described in reference to FIGS. 5 and 6.

Figure 8:
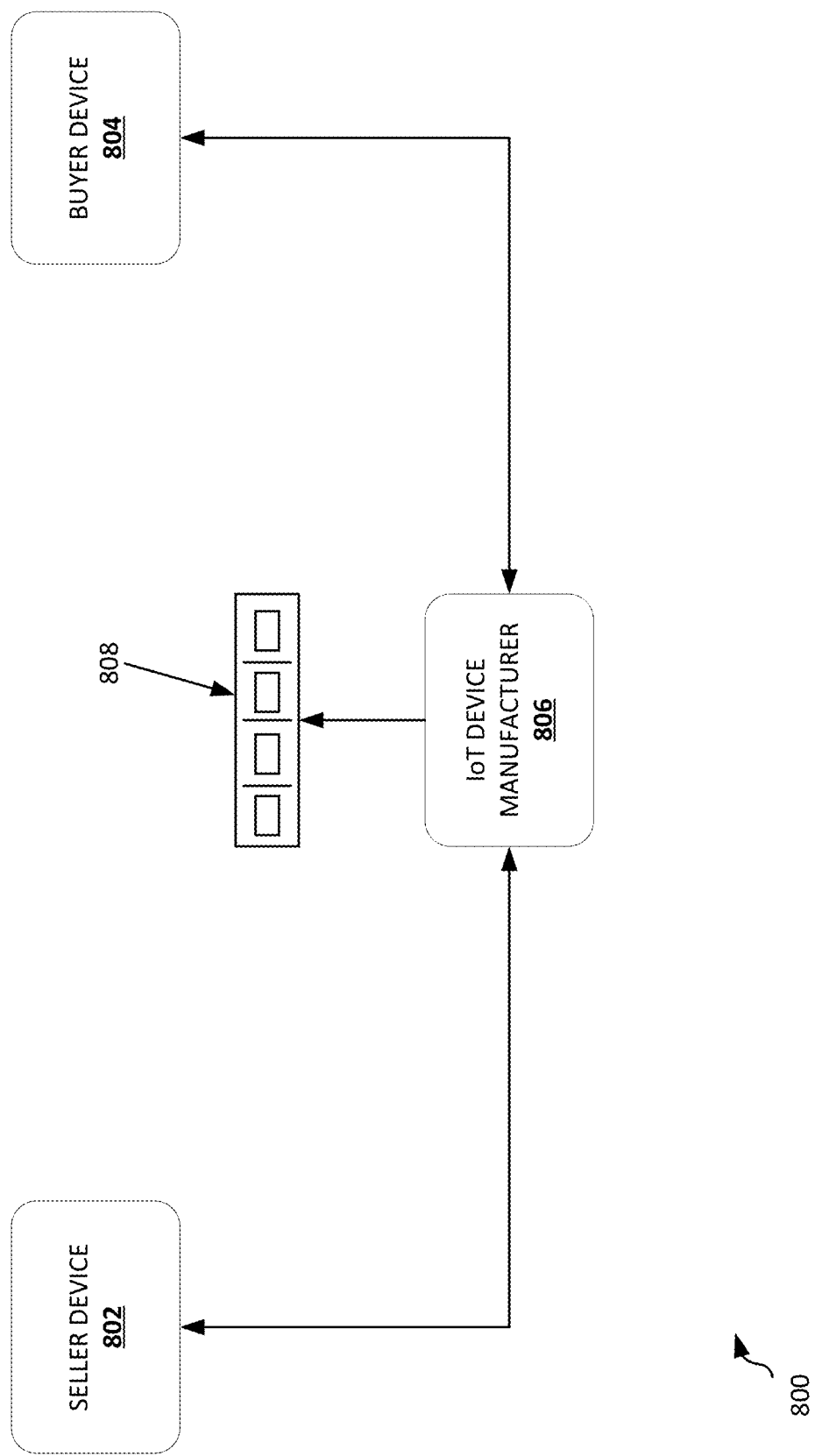
FIG. 8 illustrates a system used to transfer ownership of a device, in accordance with some embodiments of the present disclosure.

In the example shown, the operation 408 creates a credential definition for an ownership certificate. The ownership certificate includes a current owner of the IoT device. In some examples, the ownership certificate includes a record of a chain of ownership. After creating the ownership certificate, the manufacturer device issues the ownership certificate to a device associated with an owner of the IoT device. An example method for generating and issuing an ownership certificate is illustrated in FIGS. 5 and 8.

Figure 5:
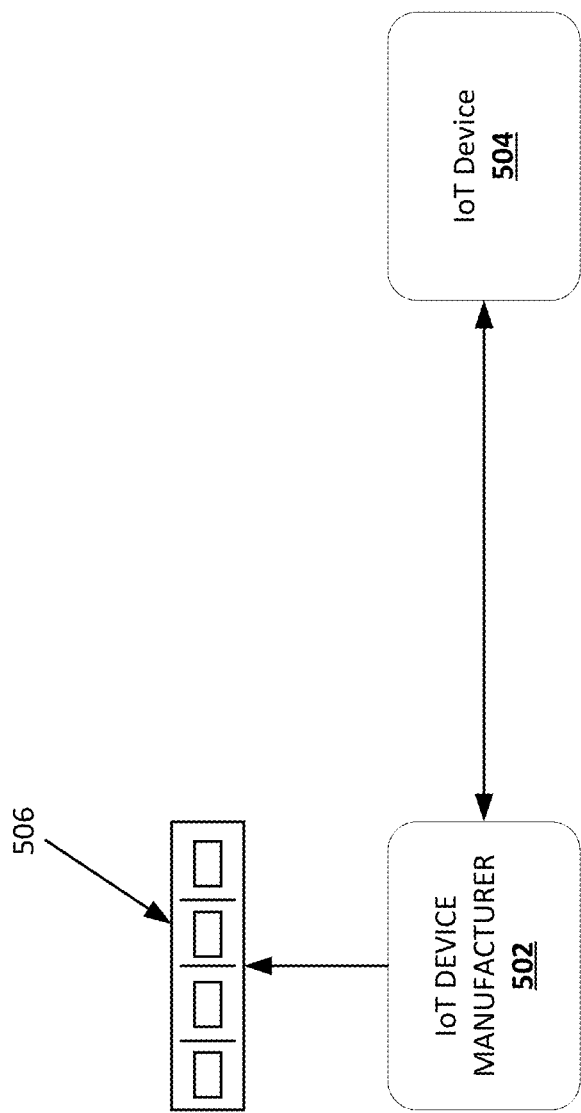
FIG. 5 illustrates a system to generate and issue an identity certificate to a device, in accordance with some embodiments of the present disclosure.

FIG. 5 illustrates an example system 500 to generate and issue an identity certificate to a device. The system includes a manufacturer device 502, an IoT Device 504, and a distributed ledger 505. Examples of suitable distributed ledgers is described herein.

The system 500 includes a manufacturer device 502. The manufacturer device 502 is configured to electronically communicate with the IoT Device 504 and a distributed ledger 505. In some examples the manufacturer device 502 connects to the distributed ledger using an IP protocol and a network, such as the Internet.

In the example shown the manufacturer device 502 can send a credential offer to the IoT Device 504 for an identification certificate. In response, the manufacturer receives a request for the identification certificate based on the credential offer. The manufacturer device 502 generates the identification certificate and records the identification certificate on the distributed ledger 506. After recording the identification certificate, the manufacturer device 502 issues the certificate to the IoT device 504. The manufacturer device 502 can be configured to operate in a similar manner to generate, record, and issue a variety of certificates to the IoT device 504. Some embodiments include other certificates.

The IoT device 504 is configured to communicate with one or more devices including the manufacturer device 502. Examples of suitable IoT devices are described herein. The IoT device 504 receives a credential offer from the manufacturer device 502. Based on the credential offer the IoT device 504 requests one or more certificates from the manufacturer device. The IoT Device 504 next receives an identification certificate issued by the manufacturer device 502. In the typical example the IoT Device 504 includes a digital wallet which is used to store the identification certificate.

FIG. 6 illustrates an example system 600 used to generate and issue an ownership certificate. The system 600 includes a manufacturer device 602, a wholesaler device 604, and a distributed ledger 606.

In the example shown, the manufacturer device 602 is a computing device which is configured to electronically interact with the distributed ledger 606 and the wholesaler device 604. The manufacturer device 602, is associated with a manufacturer of an IoT device which the manufacturer is transferring ownership to another entity. For example, IoT Device 504 illustrated and described in reference to FIG. 5. In one example, the manufacturer device 602 sends a credential offer for an ownership certificate to the wholesaler device 604 and receive a request for the ownership certificate from the wholesaler device 604. The manufacturer generates an ownership certificate which it records on the distributed ledger 606 and issues the ownership certificate to the wholesaler device 604.

The example system 600 includes a wholesaler device 604. In some embodiments the wholesaler device 604 is a computing device associated with a wholesaler entity. In some examples the wholesaler device 604 is associated with a wholesaler of IoT devices. In other examples, the wholesaler device 604 can be a device associated with any intermediatory which takes ownership of an IoT device in the supply chain for the IoT device. In some examples, a final owner may purchase an IoT device directly from a manufacturer and the device associated with the final owner is configured to interact with the manufacturer device 602 in a similar way to the wholesaler device 604. In the typical example the wholesaler device 604 receives an ownership certificate of an associated IoT device from the manufacturer device 602. The wholesaler device 604 stores the ownership certificate in a secure digital wallet.

Figure 7:
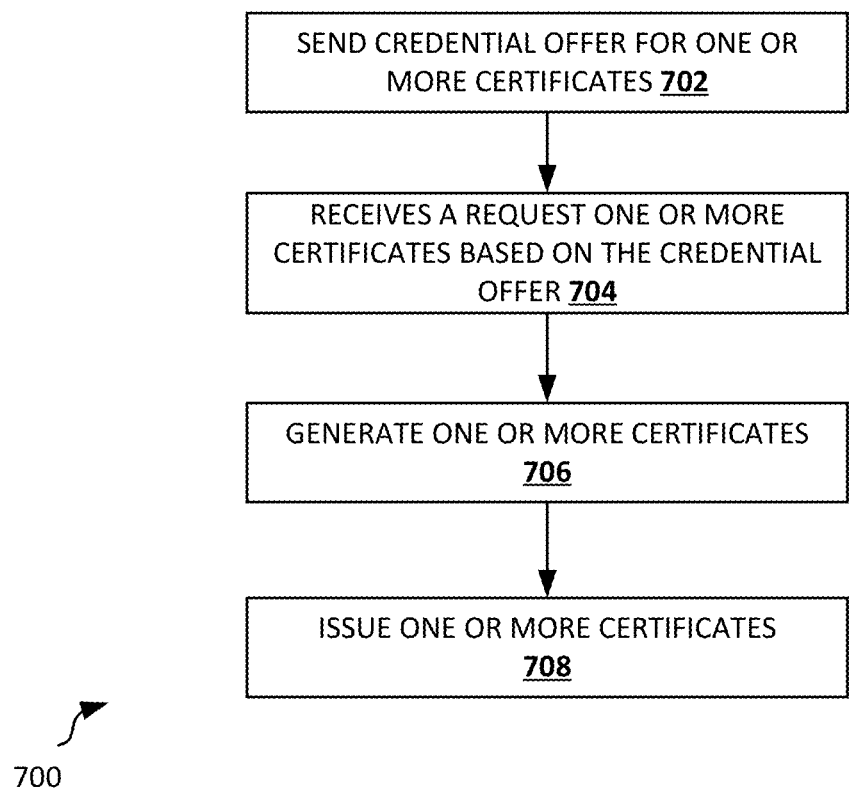
FIG. 7 illustrates a method for generating and issuing certificates, in accordance with some embodiments of the present disclosure.

FIG. 7 illustrates an example method 700 for generating and issuing a certificate. In one example the method 700 is implemented using either the example system 600 or the example method 700 as illustrated and described in FIGS. 6 and 7. The method 700 includes the operations 702, 704, 706, and 708.

The operation 702 sends a credential offer for one or more certificates. In one example, a computing device associated with a manufacturer using a network interface and a communication protocol sends a credential of for one of more certificates to second computing device associated with an entity or an IoT device. For example, the manufacturer may send a credential offer for an identity certificate to each IoT device the manufacturer produces. In other examples the manufacturer sends a credential offer for an ownership to a computing device associated with an owner of an associated IoT device.

The operation 704 receives a request for one or more certificates based on the credential offer. In one example, the credential offer is sent to an IoT device and seeks a request for an identification certificate in response. For example, as illustrated in reference to FIG. 5 the manufacturer device 502 sends a credential offer to the IoT Device 504. The IoT device 504 sends a request for a certificate in response to the manufacturer device 502. In another example the credential offer is sent to a buyer of the device and requires a request for an ownership certificate in response. For example, the system 600 illustrated in reference to FIG. 6.

The operation 706 generates one or more certificates. Example of certificates typically generated by the manufacturer device include identification certificates, which are associated with IoT devices, and ownership certificates which are associated with an owner of the IoT device. Once the certificate is generated it is recorded on the distributed ledger.

The operation 708 issues one or more certificates. For example, the manufacturer device may issue an identity certificate, or a role certificate, to the associated IoT device. In another example the manufacturer may issue an ownership certificate to a device associated with an owner of an IoT device. In some examples, issuing an ownership certificate includes issuing a set of attributes that uniquely determine the owner of the device. This certificate proof can be verified against the distributed ledger.

FIG. 8 illustrates an example system 300 for transferring ownership of a device. The system 800 includes a seller device 802, a buyer device 804, an anchor device 806, and a distributed ledger 808. Examples of suitable distributed ledgers are described herein.

The system 800 includes a seller device 802. In some examples, the seller device 802 is a computing device associated with the seller of an IoT device. Typically, the seller device includes a digital wallet which securely stores an ownership certificate fix the IoT device. The seller device 802 is configured to interact with the anchor device 806.

The system 800 includes a buyer device 804. In some examples, the buyer device 803 is a computing device associated with the buyer of the IoT device. The buyer device, in many examples, includes a digital wallet which securely stores an ownership certificate for the IoT device. The buyer device 804 is configured to interact with the anchor device 806.

The system 800 includes an anchor device 806. The anchor device 806 is a computing device which is registered as a trust anchor for the IoT device that is transferring ownerships. In some examples, the anchor device 806 is a computing device associated with the manufacturer of the IoT device. The anchor device 806 could also be the computing device associated with the owner and/or operator of the IoT device. The anchor device 806 in some examples may be the same computing device as the seller device 802.

Figure 9:
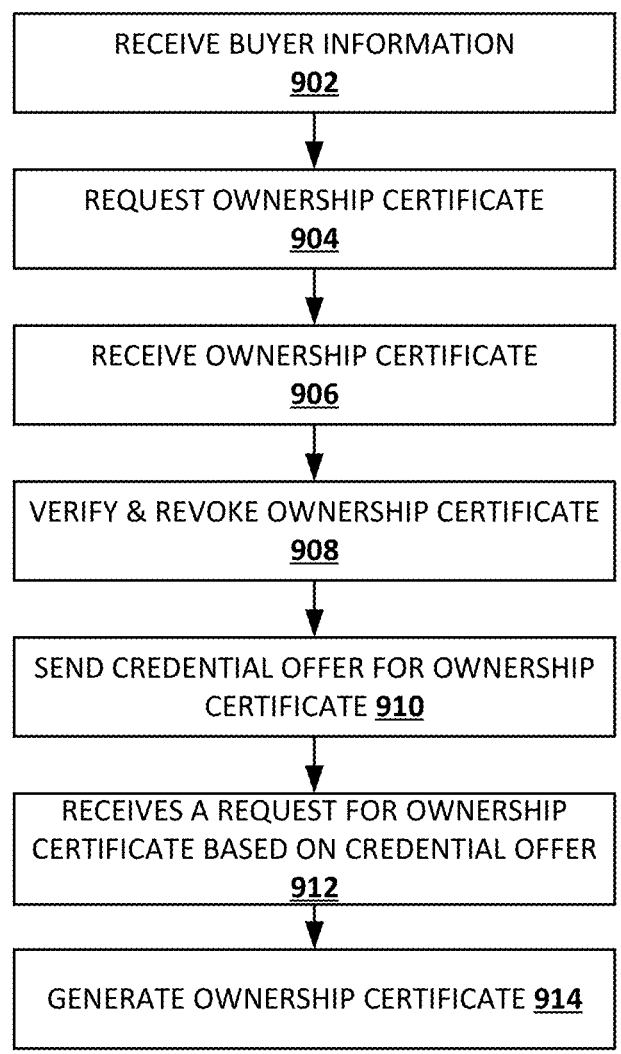
FIG. 9 illustrates a method for transferring ownership of a device, in accordance with some embodiments of the present disclosure.

FIG. 9 illustrates an example method 900 for transferring ownership of a device. In some examples the method 900 is performed using the anchor device 806 in the system 800 as illustrated in FIG. 8. The method 900 includes the operations 902, 904, 906, 908, 910, 912, and 914. In the typical example, any changes in ownership and/or custody are recorded on the distributed ledger.

The operation 902 receives buyer information from a device associated with the buyer of an IoT device. For example, the buyer may provide the anchor device the information associated with the seller to initiate the transfer process.

The operation 904 requests an ownership certificate from the seller of the IoT device. In one example, after receiving the seller information from the buyer device the anchor device sends a request to the seller device for an ownership certificate which proves ownership of the IoT device.

The operation 906 receives ownership certificate from the seller. The seller device sends the ownership certificate to the anchor device. In some examples multiple certificates which are required to authenticate the seller and the ownership of the IoT device may be sent to the anchor device.

The operation 908 verifies the ownership certificate on the distributed ledger and revokes ownership certificate form the seller. The anchor device first verifies the ownership certificate by comparing the Chain of ownership to a record on the distributed ledger. The anchor device terminates the transfer if the ownership certificate is not successfully verified. If the ownership certificate is successfully verified the anchor device makes a record on the distributed ledger marking the seller's ownership as revoked.

The operation 910 sends credential offer for ownership certificate to the buyer. After marking the ownership of the seller as revoked on the distributed ledger the anchor device sends a credential offer for an ownership certificate to the buyer.

The operation 912 receives a request for ownership certificate based on the credentialed offer. The buyer device sends a request for ownership to the manufacturer device based on the credential offer.

The operation 914 generates, records on the blockchain, and issues an ownership certificate to the buyer. The anchor device generates an ownership certificate based on the received request. The ownership certificate for the buyer is stored on the wallet of a device associated with the buyer. A cryptographic proof of the ownership certificate is recorded on the distributed ledger. The ownership certificate is then sent to the buyer device, completing the transfer of ownership for the IoT device.

FIG. 10 illustrates an example system 1000 used to establish trust with an IoT device 1004. The system 1000 includes an operator device 1002, an IoT Device 1004, and a distributed ledger 1006. Examples of suitable distributed ledgers are described herein. Example methods 1100 and 1200 illustrate methods for issuing and verifying certificates to establish trust with an IoT device. In some examples, the methods 1100 and 1200 use the system 1000.

The system 1000 includes an operator device 1002. The operator device 1002 is a computing device which is associated with an operator of one or more IoT devices. In some examples, the operator device is a device associated with the owner of the IoT device 1004. The operator device 1002 includes a network interface which is configured to communicate with other computing devices over a network. For example, the operator device 1002 is configured to electronically communicate with the IoT device 1004, as well as other computing devices. The operator device 1002 is also configured to interact with the distributed ledger 1006.

The system 1000 includes an IoT device 1004. Examples of suitable IoT devices are described herein. Typically, the IoT device 1004 includes a secure digital wallet which stores one or more certificates.

FIG. 11 illustrates an example method 1100 for establishing trust with an IoT device. In some examples the method 1100 is perforated using the operator device 1002 illustrated and described in reference to FIG. 10. The example method 1100 includes the operations 1102, 1104, 1106, 1108, 1110, and 1112.

The operation 1102 requests an identity certificate from an IoT device. In one example, a device operator takes possession of an IoT device. For example, by receiving an IoT device delivery or purchasing the IoT device at a store. To integrate the IoT device into a system the device operator first requires establishing trust with the IoT device. To establish trust with the IoT device the device operator requests an identity certificate from the IoT device.

The operation 1104 receives a device identity certificate from an IoT device. In some examples the device operator receives one or more certificates form the IoT device. The device identity certificate includes a globally unique and globally resolvable identifier.

The operation 1106 verifies the identity certificate. The device operator verifies the identity certificate using the distributed ledger. In some examples, on the distributed ledger there is a cryptographic accumulator registry for each credential issued. The owner can verify the identity certificate against the ledger using this registry to prove the attributes inside the identity certificate as true when the device has the same identifier which was assigned by the manufacturer. For example, the device operator checks a record on the distributed ledger to ensure the IoT device is the device it is claiming to be.

The operation 1108 receives a request for ownership certificate. The device operator receives a request for an ownership certificate or another form of ownership proof. In some embodiments the IoT device requests ownership certificate to verify that the device operator is the owner of the IoT device. In other examples, the IoT device may request another certificate which indicates the device operator is allowed to operate the device when the device operator is not the owner of the IoT device. For example, the device operator truly be a custodian of an IoT device and receives a request for a custodian certificate.

The operation 1110 sends ownership certificate to the IoT device where the IoT device verifies the ownership certificate on the distributed ledger. In some examples, the IoT device verifies the ownership certificate by verifying the chain of ownership (a record of owners for the device) on the distributed ledger.

The operation 1112 establishes trust with the IoT device. When both the operator device and IoT device successfully verify the requisite certificates a secure communication channel can be established between the devices. This communication channel can be used to integrate an IoT device within an IoT system.

Figure 12:
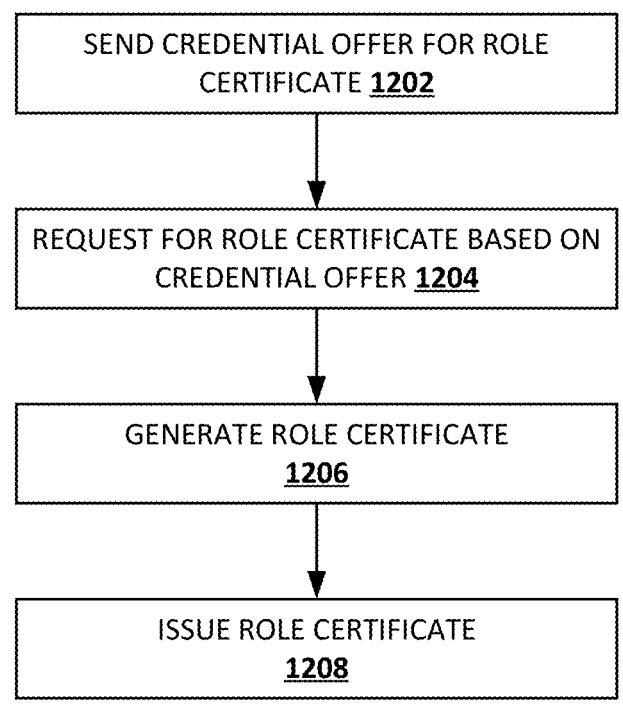
FIG. 12 illustrate a method for generating and issuing a role certificate to a device, in accordance with some embodiments of the present disclosure.

FIG. 12 illustrates an example method 1200 used to generate and issue role certificates to a device. In some examples the method 1200 is performed by the operator device 1002 as illustrated and described in reference to FIG. 10. The method 1200 includes the operations 1202, 1204, 1206, and 1208.

The operation 1202 sends a credential offer for a role certificate. In some examples a device operator sends a credential offer for a role certificate to one or more IoT devices the device operator wishes to integrate into an IoT system. To initiate the process of issuing a role certificate the device operator sends a credential offer for a role certificate to the IoT device.

The operation 1204 receives a request for role certificate based on the credential offer. The operator device receives a request for a role certificate based on the credential offer.

The IoT device may request one or more certificates which are required in order to operate the IoT device within a system.

The operation 1206 generates a role certificate for the IoT device. The device operator generates a list of devices the IoT device is allowed to establish a secure communication channel with. For example, the operation 1206 may specify the communities of interest the IoT device belongs to. In some examples the device operator may generate different permissions which make restrictions on the types of communications between devices or group of devices. After generating the role certificate, the device operator records the cryptographic proof of the role certificate on the distributed ledger.

The operation 1208 issues a role certificate. The device operator issues the role certificate to the IoT device. In some examples the IoT device stores the role certificate in a secure digital wallet.

Figure 13:
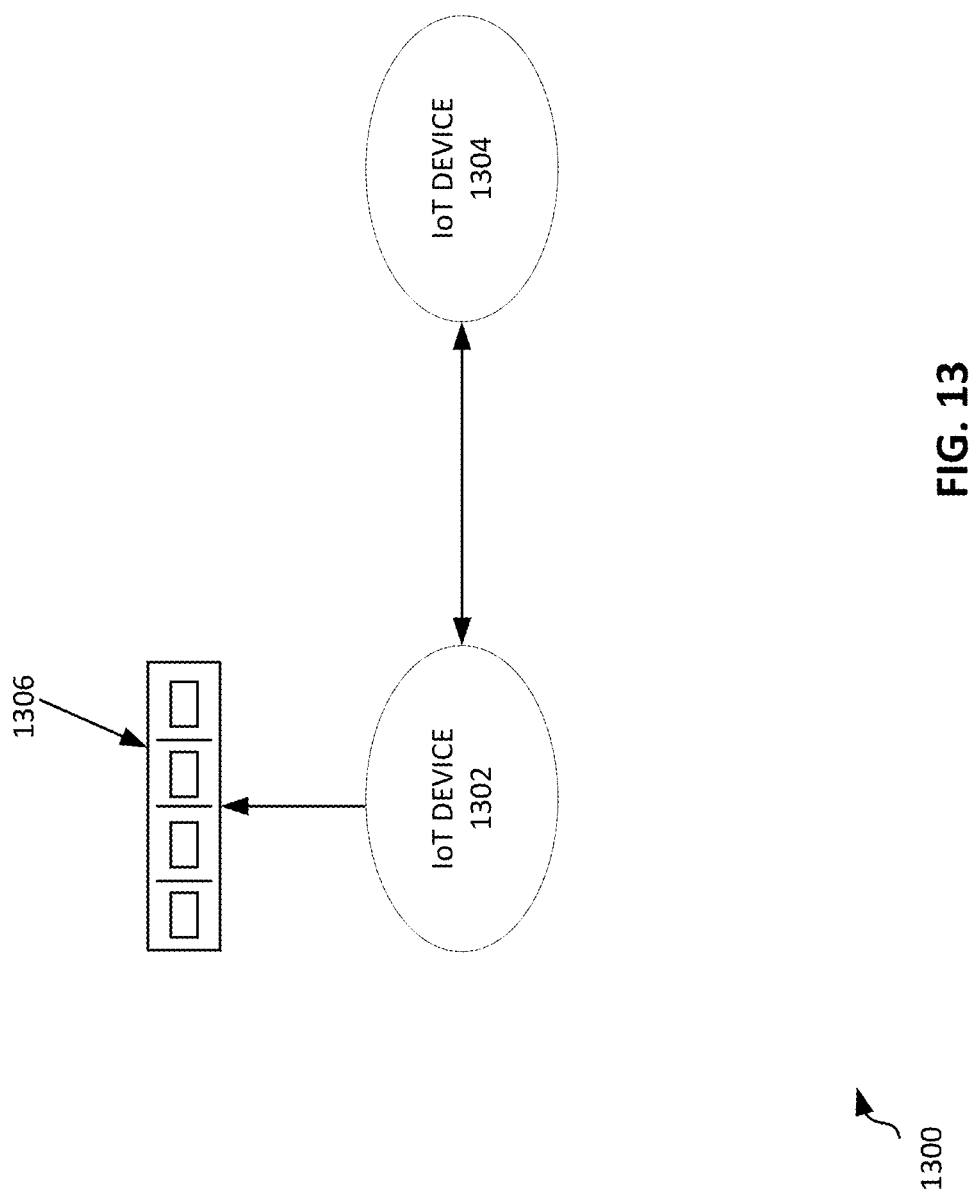
FIG. 13 illustrates an example system for mutual verification between two devices, in accordance with some embodiments of the present disclosure.

FIG. 13 illustrates an example system 1300 for mutual verification between two devices. The system includes a first IoT device 1302, a second IoT device 1304, and a distributed ledger 1306.

In the example system 1300 the first IoT device 1302 and second IoT device are configured so each device is discoverable by the other device over an electronic communication channel. Once the devices discover each other the device requests one or more certificates. The first IoT device 1302 receives one or more certificates from the second IoT device 1304 and the second IoT device 1304 receives one or more certificates from the first IoII device 1302. Each device verifies the received certificates with the cryptographic proofs of the certificates on the distributed ledger 1306. Examples of suitable distributed ledgers are described herein. After verifying the certificates each device determines whether it should establish trust with the other device.

The use of role certificates in an IoT system allows for an operator of the system to create different levels of permission and different groups with specific permissions. The operator may specify specific communities of interest which define these permissions. For example, an operator for a group of elevators may for each elevator configure a control for an actuator and a control for a user interface. The operator can configure the role certificates for each device to ensure that the control for one elevator only communicates with the actuator for the same elevator and not an actuator for a different elevator.

In similar examples, the role certificate may define what functionalities are allowed in respect to communication and control between devices. For example, the role certificates may allow only one-way communication between device. In other examples, a completely open communication channel is established.

Figure 14:
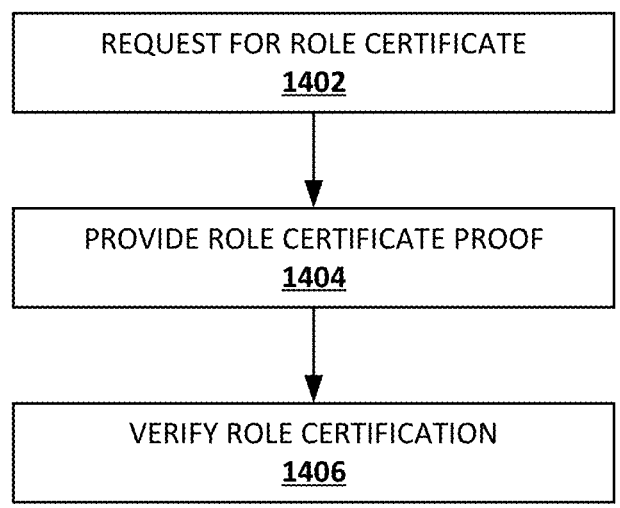
FIG. 14 illustrates a method for mutual verification of certificates between devices, in accordance with some embodiments of the present disclosure.

FIG. 14 illustrates an example method 1400 for mutual verification of role certificates between devices. In some examples the method 1400 is performed on the system 1300 illustrated and described in FIG. 14. The method 1400 is an example method to perform the operation 216, illustrated and described in reference to FIG. 2. The example described, includes a first device and a second device, however in many other examples the method is performed on a plurality of devices. The method 1400 includes the operations 1402, 1404, and 1406.

At the operation 1402 a first device requests a role certificate from a second device. The role certificate for the second device includes a list of communities of interests (COIs) the second device is a member of. In some examples, in order for the first device and second device to establish a communication channel each device is required to be a member of the same group. In some examples, at the operation 1402 the second device requests a role certificate from the first device. In other examples, the first device may provide the first device's role certificate when it sends a request to the second device.

At the operation 1404 the second device sends the role certificate to the first device. In some examples, at the operation 1404 the first device sends the first device's role certificate to the second device. In some examples, the second device also requests a role certificate from the first device and, accordingly, receives the first device's role certificate. In some examples, the first device and second device send and receive other certificates associated with the other device. Examples of such certificates include identity certificates and ownership certificates.

At the operation 1406 the first device verifies the role certificate by checking a record on a distributed ledger. The first device verifies that the second device belongs to the same communities of interest (COI(s)) in the role certificate by checking the record of the role certificate on the distributed ledger. In some examples, at the operation 1406 the second device also verifies the first devices role certificate on the distributed ledger.

After verifying the role certificate for the second device the first device determines whether to establish a communication channel at the operation 1408. In some examples, the first device determines whether the first device and second device are members of the same COI(s) and if they are members of the same COI(s) then establish a secure communication channel. Alternatively, if the first device and the second device are not members of the same group then the devices will not establish a secure communication channel.

In some examples, the operation 1408 only establishes a communication channel if both devices belong to the same owner. In other examples, the decision to establish a communication channel is based on a correctly verified chain of ownership for each device in the system.

In some examples the ownership of a device is transferred after a role certificate is issued to a device. In some examples, role certificates, and possibly other certificates, issued by the device owner to the device are revoked when the ownership of the device is transferred. In other examples, the role certificates are not revoked unless the new device owner proactively revokes the role certificates. In some examples, a new device owner may need to request the previous owner revoke some or all of the old role certificates.

In a general example, any two devices are able to establish mutual trust by validating each other's role certificates against the cryptographic proof on the distributed ledger before initiating a secure communication channel between the two devices. For example, the role certificate validation for each device can check that both devices have the same group membership. The systems and methods described can also be agnostic to the various types of IoT devices and platforms.

II. Dynamic Machine Isolation

In many embodiments multiple ha devices Share a communication network. One aspect disclosed includes methods and systems for segregating IoT device communications into separate communities of interest. Another aspect disclosed includes methods and systems for dynamic IoT device isolation.

The various IoT devices may segregate into separate communities of interest utilizing micro-segmentation of devices into separate enclaves using the STEALTH™ technology created and owned by the Unisys Corporation.

In some examples, the micro-segmentation systems and methods disclosed herein axe used to protect a network from lateral (east west, attacks on other devices in the same network. The micro-segmentation allows for granular policy-based restrictions defining which devices are allowed to communicate, while also enabling a system where a compromised IoT device is quarantined from the rest of the network. Quarantining a device from a network prevents the device from causing damage to other devices.

Figure 15:
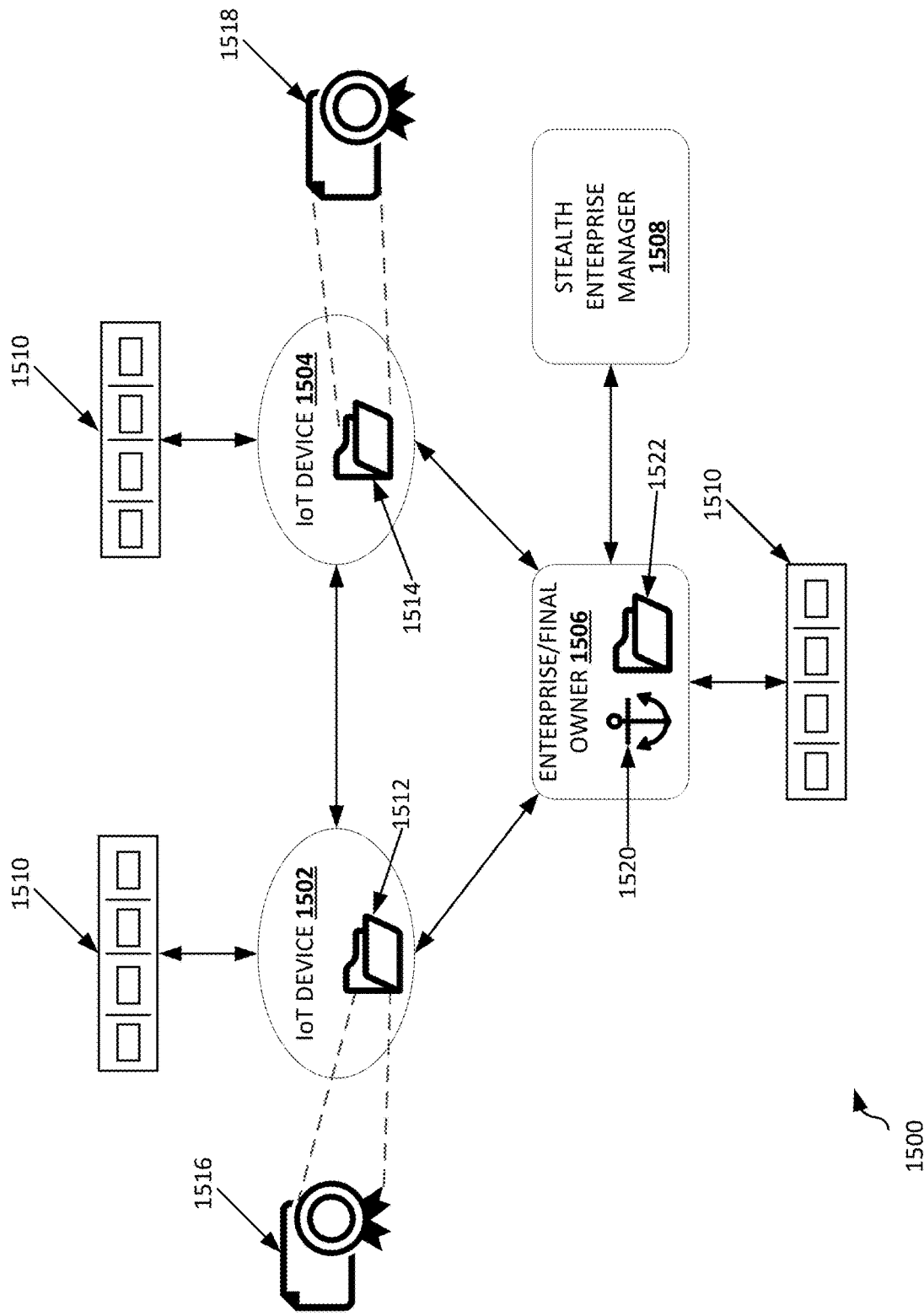
FIG. 15 illustrates a system for dynamically establishing trust or isolating devices, in accordance with some embodiments of the present disclosure.
Figure 16:
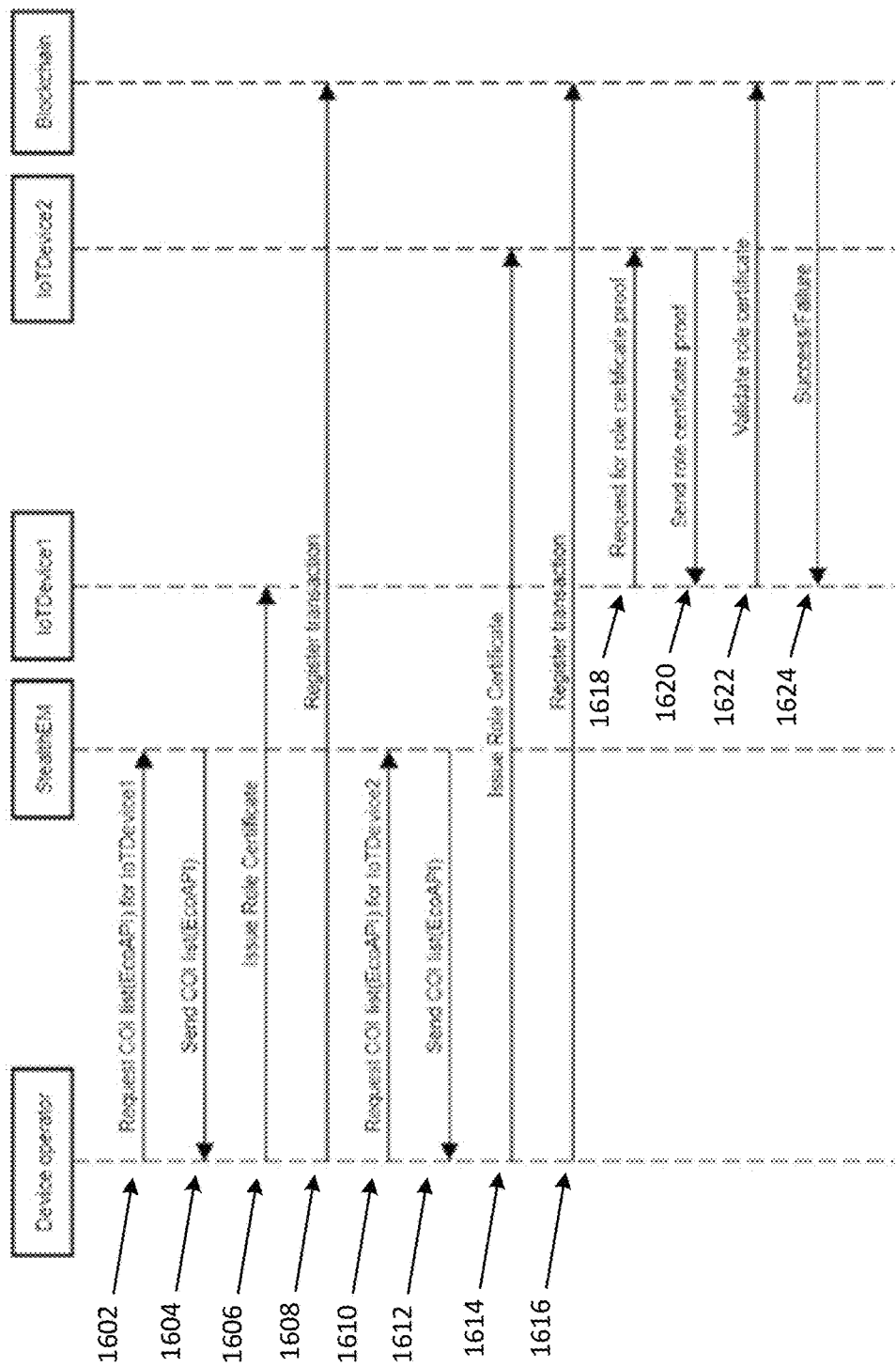
FIG. 16 illustrates a method, illustrated as a diagram, for establishing trust between devices, in accordance with some embodiments of the present disclosure.
Figure 17:
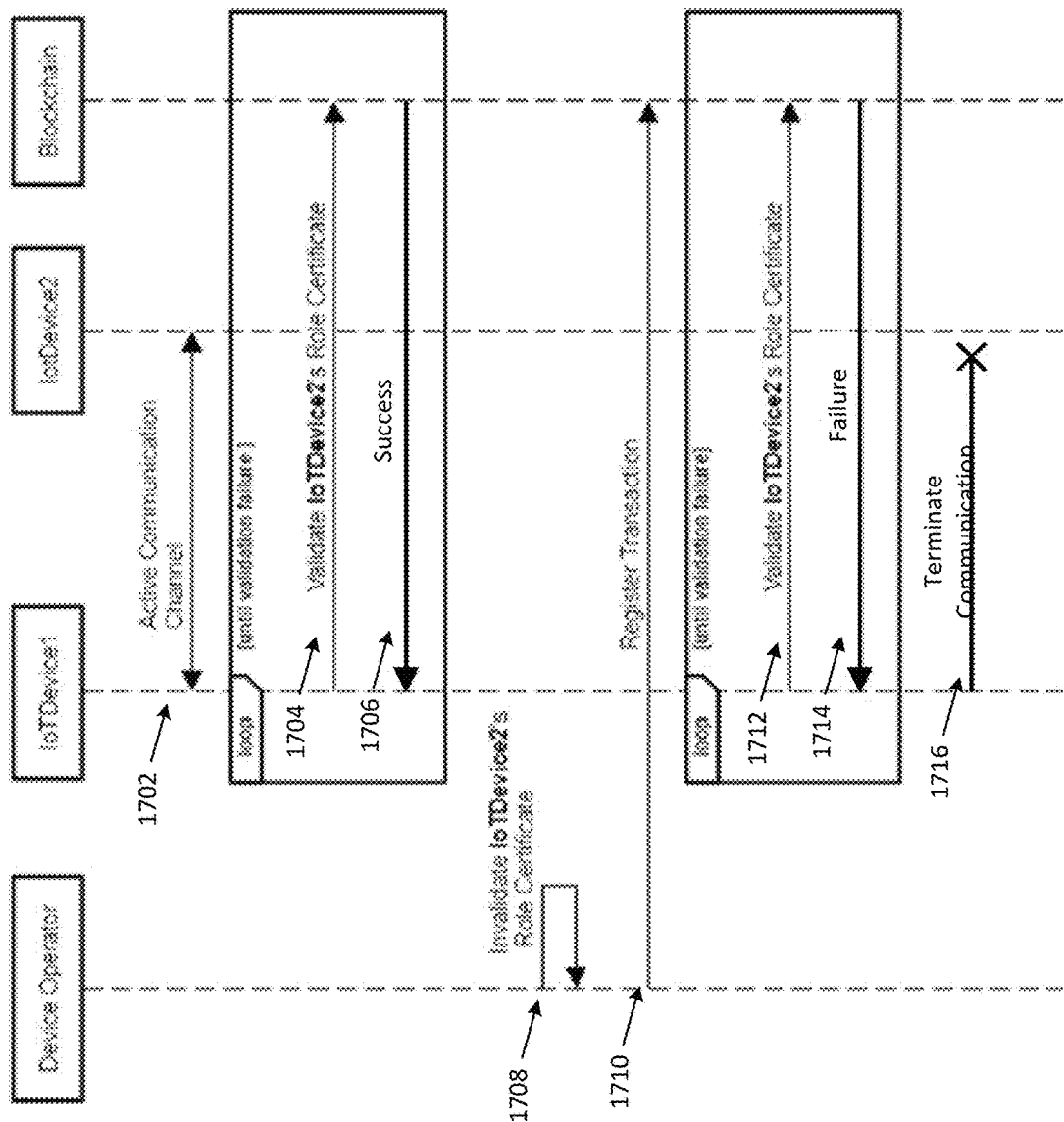
FIG. 17 illustrates a method, illustrated as a diagram, for isolating an IoT device, in accordance with some embodiments of the present disclosure.

FIGS. 15-17 generally outline systems and methods for dynamically establishing trust between 107 devices and dynamically isolating a device which becomes compromised. In some examples the methods and systems disclosed herein describe a framework for provisioning a "role certificate" that authorizes role-based, micro-segmented communication in a zero-trust manner. In some examples, the framework is decentralized.

FIG. 15 illustrates an example system 1500 for dynamically establishing trust or isolating devices. The system 1500 includes a first IoT device 1502, a second IoT device 1504, a final owner device 1506, a stealth enterprise manager 1508, and a distributed ledger 1510. The IoT devices (1502, 1504) include digital wallets 1512 and 1514. The digital wallets 1512 and 1514 contain role certificates 1516 and 1518. The final owner device 1506 includes a trust anchor 1520 and a digital wallet 1522.

The system 1500 includes a first IoT device 1502 and a second IoT device 1504. The IoT devices (1502, 1504) are generally programmable computing devices associated with one or more specific functions. Generally, the IoT devices (1502, 1504) include a network interface which allows the devices to communicate with other computing devices using one or more protocols. In some examples, the IoT devices (1502, 1504) perform secure authentication of various certificates by checking the distributed ledger 1510.

Each of the first IoT device 1502 and the second IoT device 1504 include a digital wallet (1512 and 1514). The digital wallets 1512 and 1514 are a secure store for cryptographic materials held by each entity participating in the network. In some examples, the cryptographic material includes private keys. The private keys are used to decrypt a public key on the distributed ledger 1510 which contains a message. In the example shown, the message includes a role certificate 1516 and 1518. In some examples, the digital wallets 1512 and 1514 also include decentralized identifiers which interact with public keys on the distributed ledger 1510 in a similar manner.

The digital wallets 1512 and 1514 each include a key for a corresponding role certificate (1516, 1518). In some examples, the key is referred to as a role certificate proof. In some example systems, the role certificates (1516, 1518) allow for the authorization of role-based, micro-segmented communication in a zero-trust manner. Each of the role certificates (1516, 1518) defines one or more "communities of interest" which define common channels of communication. In some examples, the role certificates (1516, 1518) are issued and/or revoked by an administrator or an IoT system administrator service. In some examples, the cryptographic material required to validate the role certificates (1516, 1518) is recorded on the distributed ledger 1510 at the time of issuance. In some examples, the role certificate can be revoked at any time by recording the revocation on the distributed ledger 1510.

The system 1500 includes a final owner device 1506. The final owner device 1506 is a computing device associated with an owner or an operator of the IoT devices 1502 and 1504. In some examples, a device operator is the end user that manages the lifecycle of device deployment, maintenance, and termination. In some examples, the final owner device 1506 is protocol agnostic to the manner of communication performed between the first IoT device 1502 and the second IoT device 1504.

The final owner device 1506 is configured to interact with the distributed ledger. In some examples the final owner device 1506 issues, a role certificate to an IoT device and records the issuance of the certificate on the distributed ledger 1510. The recording of the certificate includes the cryptographic material that is necessary to validate and provide provenance to these certificates. In some examples, one or more certificates are revoked, potentially at any time, by recording the event on the distributed ledger 1510. In some examples, the final owner device 1506 must be a trust anchor 1520 in order to issue and manage distributed ledger backed certificates.

The final owner device 1506 includes a trust anchor 1520. The trust anchor 1520 defines an entity that is verified and given the role-based capability of issuing decentralized identifiers and role certificates (for example: 1516, 1518) onto the distributed ledger 1510. The trust anchor 1520 helps bootstrap other entities on to the distributed ledger 1510 by acting as a facilitator. In some examples, the final owner device 1500 is registered as the trust anchor for the first IoT device 1502 and the second IoT device 1504 on the distributed ledger 1510.

The final owner device 1506 includes a digital wallet 1522. A digital wallet 1522 is a secure store for cryptographic materials held by the final owner device 1506. Examples include private keys associated with one or more certificates. Example of certificates include ownership certificates and role certificates.

The system 1500 includes a stealth enterprise manager 1508. The stealth enterprise manager 1508 is a service which manages an IoT system. In some examples the stealth enterprise manager 1508 includes an API used to perform various IoT system management functions. One example of a function is creating a community of interest group. A community of interest (COI) group lists a group of entities, such as computing devices and IoT devices, which are allowed to communicate with each other over a network. Another function includes defining a role. A role is a collection of users and groups which share the same set of COIs.

The system 1500 includes a distributed ledger 1510. Examples of suitable distributed ledgers are described herein. One example of a suitable distributed ledger includes Hyperledger Indy.

FIG. 16 illustrates an example method 1600, illustrated as a diagram, for establishing trust between IoT devices. The method 1600 includes the operations 1602, 1604, 1606, 1608, 1610, 1612, 1614, 1616, 1618, 1620, 1622, and 1624. Other example systems and methods for establishing trust with an IoT device are illustrated in reference to FIGS. 1-14.

In the example shown, a device operator requests a community of interest list for a first IoT device at the operation 1602. In some examples, the device operator uses an API to interact with an IoT system service to request a list of community of interest (COI) that include the first IoT device. A community of interest is a group of entities which communicate with each other over the network. In this example the entities include "IoTDevice1" and "IoTDevice2." In some examples, the IoT system service is a stealth enterprise manager ("StealthEM") using the stealth EcoAPI.

A device operator receives a community of interest first from an IoT system service at the operation 1604. The device operator generates a role certificate which defines the list of community of interests for the first device. In some examples generating the role certificate includes generating a private key which is provided to the first IoT device and a public key which is registered on the distributed ledger (referred to in FIG. 16 as "Blockchain").

A device operator issues a role certificate to a first IoT device at the operation 1606. In some examples, issuing a role certificate to an IoT device includes transferring a private key to the device, and where the private key is used to unlock a message in conjunction with a public key (or address) on the distributed ledger. Additionally, in some examples, the first IoT device stores the role certificate in a digital wallet.

A device operator registers the issuance of the role certificate on a blockchain at the operation 1608. The device operator records the certificate on a distributed ledger which allows the global verification of the certificate by any device which is able to connect to the blockchain.

A device operator requests a community of interest list for a second IoT device at the operation 1610. The device operator performs a similar request for a list of COIs for the second device, as performed for the first device at the operation 1602.

A device operator receives a community of interest list from a device security service at the operation 1612. The device operator generates a role certificate which defines the list of COIs that include the second IoT device.

A device operator issues a role certificate to the second IoT device at the operation 1614. The second device receives the role certificate and, in some examples, store the role certificate in a digital wallet.

A device operator registers the issuance of the role certificate on the block chain at the operation 1616. The device operator records the role certificate on the digital ledger.

Another example method of issuing role certificates to IoT devices is illustrated and described in the example of FIG. 12.

The first IoT device requests role certificate proof from the second IoT device at the operation 1618. In some examples at the operation 1618 the second device also requests a role certificate proof from the first device, in order to perform mutual verification of each device.

The first IoT receives role certificate proof from the second IoT device at the operation 1620. In some examples the second device also receives the role certificate proof from the first device. The first IoT device and second IoT device can use any network communication protocol which is supported by both devices.

The first IoT device validates the role certificate on the blockchain at the operation 1622. The role certificate proof contains cryptographic material which is able to validate a role certificate using a distributed ledger. In some examples, the first device uses a private key included in the role certificate proof to unlock a message based on a public key stored on the blockchain. The message is used to validate invalidate the role certificate. In some examples, the second IoT device validates the first devices role certificate at the operation 1622.

The first IoT device determines whether the validation of the role certificate was a success or failure at the operation 1624. In some examples, the first IoT device validates that the second IoT device is authentic using the role certificate verification. In other examples, the first IoT device also requests an identity certificate from the second device in order to verify that the second device is authentic. The first device also verifies that the second device belongs in a common community of interest using the role certificate.

FIG. 17 illustrates an example method 1700, illustrated as a diagram, for isolating an IoT device. The method 1700 includes the operations 1702, 1704, 1706, 1708, 1710, 1712, 1714, and 1716.

At the operation 1702 an active communication channel is open between a first IoT device and second IoT device. In some examples, the method illustrated and described in reference to FIG. 16 is used to establish an active communication channel between devices. An active communication channel can use any protocol or technology supported by the IoT devices in communication. Device native protocols which could be used in some examples include BLE, BACnet, Modbus, ZigBee, 6LOWPAN, MQTT, etc.

In the example shown, the first IoT device validates the second IoT device's role certificate on the blockchain at the operation 1704. Validating the role certificate in some examples includes verifying the second IoT device and verifying the role certificate on the blockchain. In other examples validating the IoT device includes only validating the other device's role certificate. In the example embodiment, the validation of the role certificate is done at regular intervals.

The first to device receives a successful verification of the second IoT devices role certificate at the operation 1706. If the validation of the role certificate is successful, the communication channel remains active.

In some examples, the operations 1704 and 1706 are performed by the first IoT device periodically, or sometimes executed in a periodic loop, until the validation of the role certificate fails. For example, the validation of the role certificate fails at the operation 1714 ending the loop. In some examples, the to T devices may validate the revocation of role certificates using a variety of mechanisms that may be push or pull based.

A device operator invalidates the second IoT device's role certificate at the operation 1708. In some examples, the device operator invalidates the second IoT device's role certificate after an indication that the device is compromised. For example, a monitoring service OR the active communication channel may notice that malicious traffic is being sent from the second IoT device. In another example, the device operator may be aware of a security issue for a device from a specific manufacturer and can invalidate the role certificates for each device made by the specific manufacturer. Other services can be used to give the device operator an indication that a device may be a risk to the network. In some examples, in order to revoke a role certificate for a device the device operator must be a trust anchor for the device.

A device operator registers the invalidation of the second IoT device's role certificate at the operation 1710. In some examples, once the device operator intends to isolate the second IoT device's role certificate the device operator registers the revocation on the blockchain. Recording the revocation on the blockchain allows for the system to scale in a decentralized manner. Additionally, the device operator can be agnostic to the protocols used by the first device and the second device as long as each device in the system is able to communicate with the blockchain. Recording the revocation on the blockchain also provides verifiable provenance for all issued role certificates making it easy for the devices to establish or terminate trust.

The operation 1712 includes the first device validating the role certificate associated with the second device on the blockchain. The operation 1712 validates the role certificate in similar manner to the operation 1704, however, this validation is after the revocation of the role certificate is registered on the blockchain.

The operation 1714 includes a validation failure of the second device's role certificate on the blockchain. The validation of die role certificate fails since the role certificate has been invalidated. In this manner the first IoT device discovers that the second IoT device's role certificate is invalid without needing to trust the second IoT device. Once the validation fails the loop of validation the role certificate is exited.

The operation 1716 terminates communication with the second IoT device. The first device ceases communications with the second IoT device. In some examples, after revoking the role certificate from the second device the second device is inspected, disinfected, and restored.

In some examples, communication between the first IoT device and the second IoT device can be restored. The device operator can reissue a new role certificate which acts as a de-isolation event. The two devices can re-validate to establish an active communication channel.

III. Universal Authentication Service

In another aspect, methods and systems for a universal authentication service for an IoT system are disclosed. The universal authentication service is used to enable trust autonomously between Ica devices (M2M communication). In some examples, IoT systems are described for identifying IoT devices. Some aspects include identity of things (IDoT) technologies. IDoT involves verifying identity and establishing trust levels of various entities such as devices, people, applications, cloud services, and/or gateways operating in an IoT environment. In many examples IoT devices in an IoT network or an IoT system comprise of a fragmented range of devices, software, communications protocols, people, and systems. In some examples a universal authentication service is described which allows for the identity of the fragmented range of devices.

Additionally, some devices contain resource constraints. Similarly, some networks have bandwidth constraints. Some aspects described include authentication methods which require minimal resources. For example, methods which require little processing power. Additionally, interoperable authentication methods are disclosed. For example, authentication methods for operating both Internet Protocol (IP)-based and non-IP-based devices are disclosed.

Figure 18:
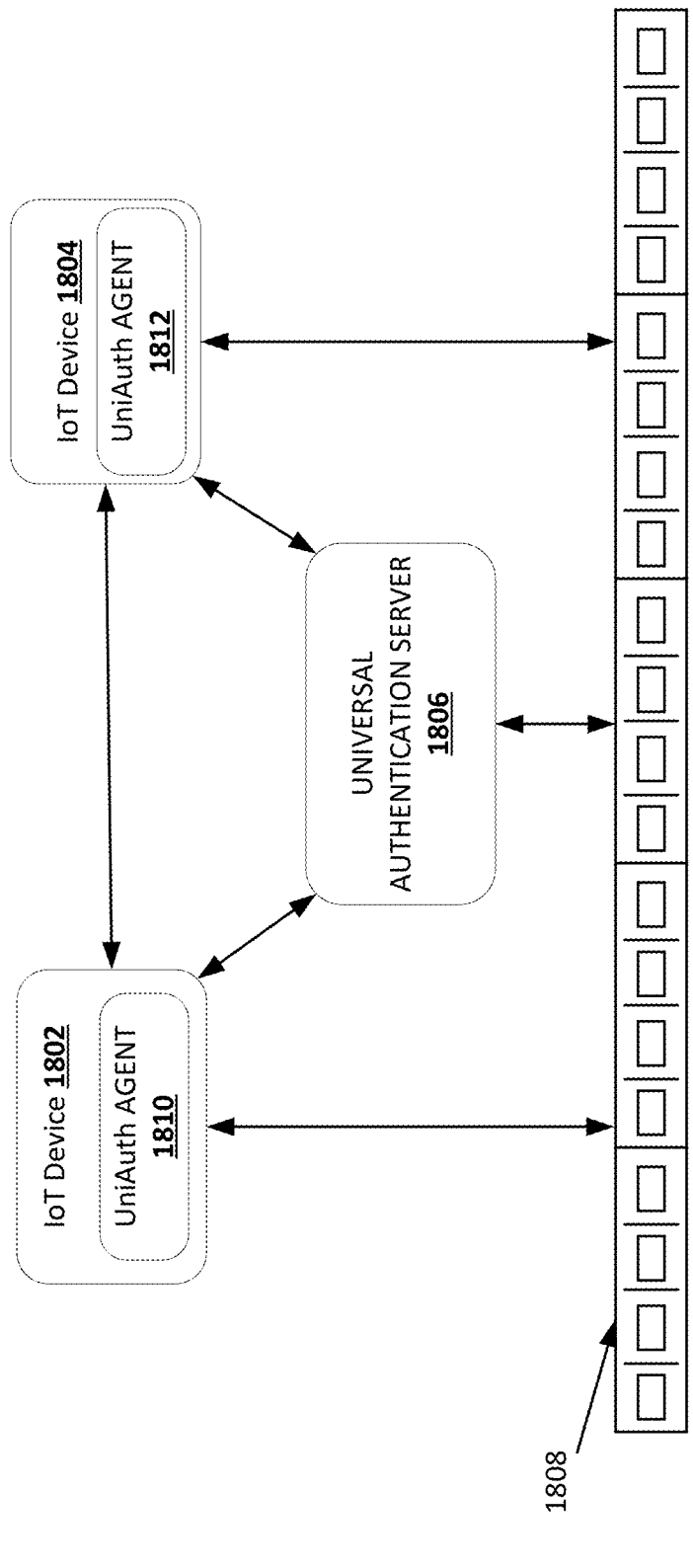
FIG. 18 illustrates a system for communication protocol agnostic IoT device authentication, in accordance with some embodiments of the present disclosure.

FIG. 18 illustrates an example system 1800 for communication protocol agnostic IoT device authentication. The system 1800 includes a first IoT Device 1802, a second IoT Device 1804, a universal authentication server 1806, and a distributed ledger 1808.

The system 1800 includes a first to Device 1802 and a second IoT Device 1804.

The first IoT Device 1802 includes a Universal Authentication Agent 1810 and the second IoT Device 1804 includes a Universal Authentication Agent 1812. In some examples, the universal authentication agents 1810 and 1812 are lightweight and protocol agnostic. For example, the universal authentication agent can have a small executable footprint and can authenticate the associated IoT device directly on the distributed ledger 1808 or through the Universal authentication server 1806. For example, the universal authentication agent 1810 is used by in the first IoT Device 1802 to communicate directly with the blockchain using an IP-based protocol. The Universal Authentication Agent 1810 also communicates with the universal authentication server 1806 using a device native protocol. In this manner the Universal Authentication Agents 1810 and 1812 allow for the device to perform verification steps using either IP-based or non-IP-based protocols. The universal authentication agent 1810 runs on devices using at least one of any IP-based or non-IP-based protocols.

The system 1800 includes a universal authentication server 1806. In some examples, the universal authentication server 1806 acts as a control plane for certificate management that involves certificate issuance, provisioning, inventory, monitoring, renewal, revocation, etc. In some embodiments, the universal authentication server 1806 consists of inbuilt wrappers for protocol translation and runs as an independent, standalone service in the IoT environment. The universal authentication server 1806 can be used to provide verification services to IoT devices which are not able to maintain a line of sight with the blockchain nodes. For example, devices which are non-IP-based may be unable to communicate directly with the distributed ledger 1808. Another example includes an IoT device which may be IP-enabled but does not have internet access. Such devices use the universal authentication server 1806 to perform various verification operations and the universal authentication server 1806 manages the profiles for these on the distributed ledger 1808.

In some examples, the functionality of the universal authentication server 1806 is implemented in a service which can run off a variety of computing devices. In some examples, the service is run on a remote server or cloud. In such an example some devices which do not have the processing, power to perform verification directly with the blockchain connects with the universal authenticating service. In other examples, a local IoT device performs the universal authentication service.

In some examples, some IoT devices may not have the processing power to perform the cryptography required to interact with the blockchain. The universal authentication service can connect to this device and perform the cryptography functions.

In one example, the system 1800 includes a first IoT device 1802 which is a sensor for an engine in an airplane. The first IoT device may include IP-protocol functionality and native device protocol functionality. At an origin airport the first IoT device may successfully connect to a network (for example, using In this scenario the first IoT device uses direct verification on the distributed ledger. However, when the airplane travels and lands at a different airport the first IoT device may not contain the proper credentials to connect to the network using an IP-protocol. In this scenario the first IoT device may perform verification of other IoT devices using the universal authentication server, which may include 4G/5G connectivity. In this scenario the universal authentication agent allows the first IoT device 1802 the flexibility to connect in different environments.

Methods and systems used for verification, and/or mutual verification between two IoT devices are described herein in reference to FIGS. 1-17. In some examples, the IoT device or the universal authentication service uses one or more digital certificates to establish trust Additional certificates can be used to offer different levels of trusts based on attributes of single or combination of certificates. Examples of such certificates include identity certificates, role certificates, and ownership certificates.

The system 1800 includes a distributed ledger 1808. In some examples, the distributed ledger 1808 includes a blockchain. Suitable examples of distributed ledgers are described herein.

Figure 19:
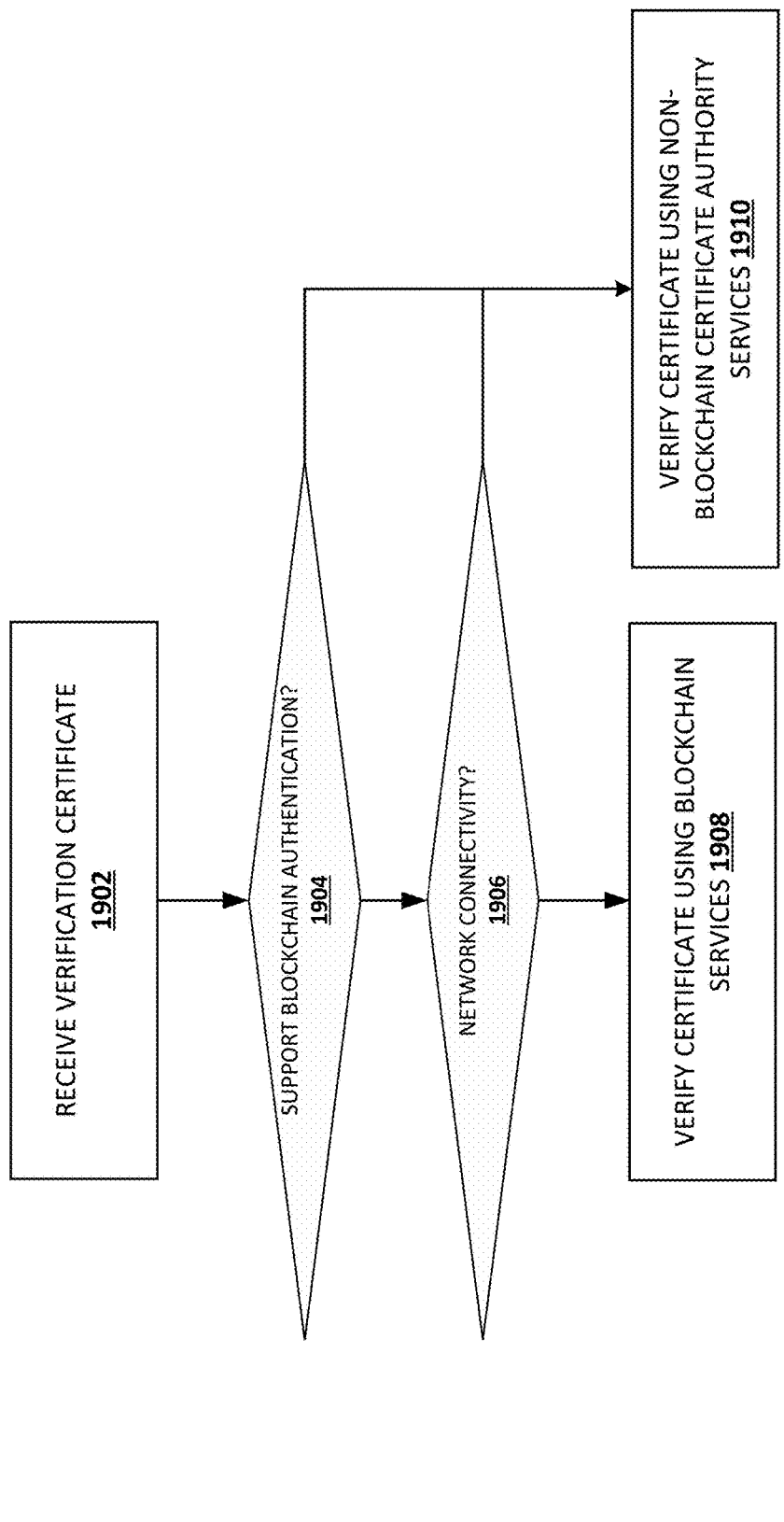
FIG. 19 illustrates a block diagram outlining a system for protocol agnostic IoT device authentication, in accordance with some embodiments of the present disclosure.

FIG. 19, illustrates an example method 1900 for performing device authentication using a universal authentication agent. In some examples the method is performed by one of the universal authentication agents (1810, 1812) illustrated and described in reference to FIG. 18. The method 1900 includes the operations 1902, 1904, 1906, 1908, and 1910.

The operation 1902 receives a verification certificate. For example, a first IoT device may receive a role certificate from a second device. In another example, a first IoT device may receive an ownership certificate from a computing device associated with an owner of the device.

The operation 1904 determines whether the IoT device supports blockchain authentication. If the device supports blockchain authentication the universal authentication agent will continue to determine if the device can perform the authentication steps directly with the blockchain. If the IoT device does not support blockchain authentication the universal authentication agent will use a non-blockchain certificate authority service to perform the authentication steps. For example, the IoT device may not contain the necessary processing power to perform the cryptography necessary to verify a certificate on the blockchain, the universal authentication will route the received certificate to use the certificate authority service.

The operation 1906 determines whether the IoT device has connectivity to a network which allows for communicating with the bloc chain. In some cases, the IoT device may support blockchain authentication, however, may not have visibility because connectivity with an appropriate network is unviable. If the IoT device does not have network connectivity the universal authentication agent may try to verify the certificate using a non-blockchain certificate authority service. Conversely, if the device has appropriate network connectivity the universal authentication agent verifies the certificate using blockchain services.

In some instances, the to device may have the option to verify one or more certificates either directly on the blockchain or indirectly using a universal authentication service. In these instances, the universal authentication agent can route the certificates through which ever service has priority. In some examples, the universal authentication agent may try to optimize the authentication process by determining whether in the environment it is more efficient to route a certificate to a specific service.

The operation 1908 verifies the verification certificate using blockchain services. In some examples blockchain services include services for: issuance, inventory, revocation, and other IoT device services. These services are done by directly interacting, recording, and modifying the blockchain. Examples of methods and systems implementing and using such services are illustrated and described in reference to FIGS. 1-17.

The operation 1910 verifies the verification certificate using non-blockchain certificate authority services. Examples of non-blockchain certificate authority services include: issuance, inventory, revocation, and other IoT services. In some examples the non-blockchain certificate authority uses a server which is able to check and/or update the blockchain to complete these services. In other examples, the services are provided locally without connecting to the blockchain. In some examples the universal authentication agent is not agnostic to how the services provide the authentication services, which allows for the agent to route certificates while only requiring a small amount of processing power and/or limited network bandwidth usage.

In some examples, there are services which are common using blockchain or non-blockchain methods. Examples of common services include: provisioning, monitoring, and other services which are preformed using a common service.

Figure 20:
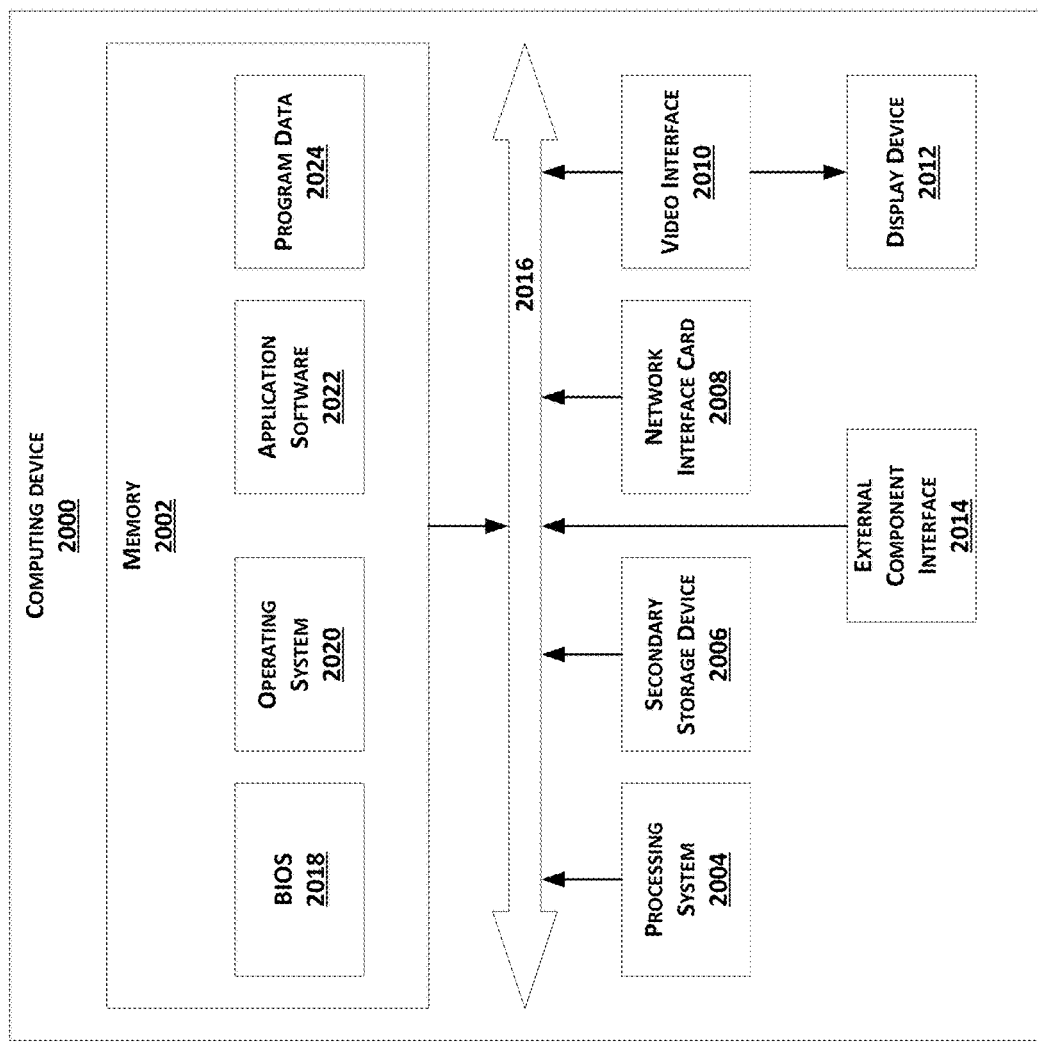
FIG. 20 illustrates a computing system, in accordance with some embodiments of the present disclosure.

FIG. 20 illustrates an example computing device 2000. The computing device 2000 includes a memory 2002, a processing system 2004, a secondary storage device 2006, a network interface card 2008, a video interface 2010, a display device 2012, an external component interface 2014, and a communication medium 2016. The memory 2002 includes one or more computer storage media capable of storing data and/or instructions. In different embodiments, the memory 2002 is implemented in different ways. For example, the memory 2002 can be implemented using various types of computer storage media.

The processing system 2004 includes one or more processing units, in various embodiments, the processing system 2004 is implemented in various ways. For example, the processing system 2004 can be implemented as one or more physical or logical processing cores. In another example, the processing system 2004 can include one or more separate microprocessors. In yet another example embodiment, the processing system 2004 can include an application-specific integrated circuit (ASIC) that provides specific functionality. In yet another example, the processing system 2004 provides specific functionality by using an ASIC and by executing computer-executable instructions.

The secondary storage device 2006 includes one or more computer storage media. The secondary storage device 2006 stores data and software instructions not directly accessible by the processing system 2004. In other words, the processing system 2004 performs an I/O operation to retrieve data and/or software instructions from the secondary storage device 2006. In various embodiments, the secondary storage device 2006 includes various types of computer storage media. For example, the secondary storage device 2006 can include one or more magnetic disks, magnetic tape drives, optical discs, solid-state memory devices, and/or other types of computer storage media.

The network interface card 2008 enables the computing device 2000 to send data to and receive data from a communication network. In different embodiments, the network interface card 2008 is implemented in different ways. For example, the network interface card 2008 can be implemented as an Ethernet interface, a token-ring network interface, a fiber optic network interface, a wireless network interface (e.g., Wi-Fi, WiMAX, etc.), or another type of network interface.

The video interface 2010 enables the computing device 2000 to output video information to the display device 2012. The video interface 2010 Call communicate with the display device 2012 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 2014 enables the computing device 2000 to communicate with external devices. For example, the external component interface 2014 can be a USB interface, a FireWire interface, a serial port interface, a parallel port interface, a PS/2 interface, and/or another type of interface that enables the computing device 2000 to communicate with external devices. In various embodiments, the external component interface 2014 enables the computing device 2000 to communicate with various external components, such as external, storage devices, input devices, speakers, modems, media player docks, other computing devices, scanners, digital cameras, and fingerprint readers.

The communication medium 2016 facilitates communication among the hardware components of the computing device 2000. The communication medium 2016 facilitates communication among the memory 2002, the processing system 2004, the secondary storage device 2006, the network interface card 2008, the video interface 2010, and the external component interface 2014. The communications medium 2016 can be implemented in various ways. For example, the communications medium 2016 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 2002 stores various types of data and/or software instructions. For instance, in the example of FIG. 20, the memory 2002 stores a Basic Input/Output System (BIOS) 2018 and an operating system 2020. The BIOS 2018 includes a set of computer-executable instructions that, when executed by the processing system 2004, cause the computing device 2000 to boot up. The operating system 2020 includes a set of computer-executable instructions that, when executed by the processing system 2004, cause the computing device 2000 to execute steps necessary to conduct the various method described herein. The memory 2002 also stores program data 2024. The program data 2024 is data used by programs that execute on the computing device 2000.

Although particular features are discussed herein as included within a computing device 2000, it is recognized that in certain embodiments not all such components or features may be included within a computing device executing in accordance to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. Communication media may be embodied by computer readable instructions, data structures program modules, or other data in a modulated data signal, such as a carrier wave or other transport mechanism, and includes any information deli very media.

It is noted that, although in the embodiments of FIG. 20 shown in the computing device 2000 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (SPar) and virtualization system provided by Unisys Corporation of Blue Bell, Pa.

The described system may be implemented with existing blockchain technologies. Alternatively, the described system may be implemented with new distributed technologies or new blockchain technologies. The blockchain may be maintained publicly or privately.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of IoT device to device communication, technologies disclosed herein are applicable to trusted device communication generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein anchor some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the Operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A system comprising:
   a first IoT device (Internet of Things);
   a second IoT device configured with an active communication channel with the first IoT device and a role certificate; and
   an operator device configured to interact with a distributed ledger to issue and revoke role certificates for a plurality of devices including the first IoT device and the second IoT device;

wherein, the first IoT device periodically validates a role certificate proof received from the second IoT device with an entry of the role certificate proof recorded on the distributed ledger.

2. The system of claim 1, wherein the first IoT device terminates the active communication channel when the validation of the role certificate proof fails.

3. The system in claim 1, wherein the operator computing device invalidates the role certificate in response to an indication that the second IoT device is compromised.

4. The system of claim 1, wherein the validation of die role certificate proof does not depend on the protocol used for the active communication channel.

5. The system of claim 1, wherein the role certificate includes one or more communities of interest which defines a group of devices the second IoT device is allowed to establish a communication channel with.

6. The system of claim 1, wherein the operator computing device is connected to a centralized management service which defines the role certificate for the plurality of devices.

7. A method of establishing trust between devices, the method comprising:
    establishing, at a first IoT (Internet of Things) device, a communication channel with a second IoT device;
    requesting and receiving, at the first IoT device, a role certificate proof from the second IoT device, wherein the role certificate proof is managed by an operator device; and
    verifying periodically, at the first IoT device, the role certificate proof with an entry of the role certificate proof recorded on a distributed ledger.

8. The method of claim 7, the method further comprising: terminating the communication channel when the validation of the role certificate proof fails.

9. The method of claim 7, the method further comprising: invalidating, by the operator device, the role certificate and updating the entry of the role certificate proof on the distributed ledger in response to an indication that the second IoT device is compromised.

10. The method of claim 7, wherein the validation of the role certificate does not depend on the protocol used for the active communication channel.

11. The method of claim 7, wherein the role certificate includes one or more communities of interest which defines a group of devices the second IoT device is allowed to establish a communication channel with.

12. The method of claim 7, wherein the operator device is connected to a centralized management service which defines the role certificate for a plurality of devices.

13. A method for managing devices, the method comprising:
    assigning, from an operator device, a first role certificate to a first IoT (Internet of Things) device and a second role certificate to a second IoT device;
    registering, using the operator device, a proof for each of the role certificates on a distributed ledger;
    invalidating a role certificate for the second IoT device;
    registering the invalidation of the role certificate on the distributed ledger, such that the first IoT device terminates communication with the second IoT device when validating the second role certificate.

14. The method of claim 13, wherein the operator device is unaware of a communication protocol used between the first IoT device and the second IoT device.

15. The method of claim 13, wherein, the first IoT device periodically validates the role certificate of the second IoT device on the distributed ledger.

16. The method of claim 13, wherein invalidating the role certificate is done in response to receiving an indication that the second IoT device is compromised.

17. The method of claim 13, the method further comprising:
    receiving, at the operator device, a community of interest list from a centralized service; and
    generating, at the operator device, a role certificate based on the community of interest list.

18. The method of claim 17, wherein the first IoT device and second IoT device establish a communication channel based on both devices being included in the community of interest list.

19. The method of claim 17, wherein the operator device assigns the role certificate to an associated device.

20. The method of claim 13, wherein the operator device reissues a role certificate to the second IoT device to resume communications between the first IoT device and the second IoT device.

* * * * *